(12) United States Patent
Ding et al.

(10) Patent No.: US 10,936,870 B2
(45) Date of Patent: Mar. 2, 2021

(54) METHOD FOR SELECTIVELY DEPLOYING SENSORS WITHIN AN AGRICULTURAL FACILITY

(71) Applicant: Iron Ox, Inc., San Carlos, CA (US)

(72) Inventors: Winnie Ding, San Carlos, CA (US); Jonathan Binney, San Carlos, CA (US); Brandon Ace Alexander, San Carlos, CA (US); Nicole Bergelin, San Carlos, CA (US)

(73) Assignee: Iron Ox, Inc., San Francisco, CA (US)

( * ) Notice: Subject to any disclaimer, the term of this patent is extended or adjusted under 35 U.S.C. 154(b) by 48 days.

(21) Appl. No.: 16/504,209

(22) Filed: Jul. 5, 2019

(65) Prior Publication Data

US 2020/0012852 A1 Jan. 9, 2020

Related U.S. Application Data

(60) Provisional application No. 62/694,410, filed on Jul. 5, 2018.

(51) Int. Cl.
*G06K 9/00* (2006.01)
*G06F 9/38* (2018.01)
(Continued)

(52) U.S. Cl.
CPC ....... *G06K 9/00657* (2013.01); *A01G 25/167* (2013.01); *G05B 19/41885* (2013.01);
(Continued)

(58) Field of Classification Search
CPC ........... G06K 9/00657; G06K 2209/17; A01G 25/167; A01G 7/00; A01G 22/00; A01G 9/0299; A01G 9/143; A01G 9/02; A01G 9/085; A01G 9/086; G05B 19/41885; G06F 9/3891; G06F 17/11; G01N 33/0098; G01N 2033/245; A01B 79/005; A01B 69/008; G06T 2207/30188; G06T 2207/10024;
(Continued)

(56) References Cited

U.S. PATENT DOCUMENTS 9,339,023 B2 * 5/2016 Ballu ................... A01M 7/0057
9,489,576 B2 * 11/2016 Johnson ................. G01C 11/04
(Continued)

*Primary Examiner* — Michael S Osinski
(74) *Attorney, Agent, or Firm* — Run8 Patent Group, LLC; Peter Miller

(57) ABSTRACT

One variation of a method for deploying sensors within an agricultural facility includes: accessing scan data of a set of modules deployed within the agricultural facility; extracting characteristics of plants occupying the set of modules from the scan data; selecting a first subset of target modules from the set of modules, each target module in the set of target modules containing a group of plants exhibiting characteristics representative of plants occupying modules neighboring the target module; for each target module, scheduling a robotic manipulator within the agricultural facility to remove a particular plant from a particular plant slot in the target module and load the particular plant slot with a sensor pod from a population of sensor pods deployed in the agricultural facility; and monitoring environmental conditions at target modules in the first subset of target modules based on sensor data recorded by the first population of sensor pods.

20 Claims, 6 Drawing Sheets

(51) Int. Cl.
*A01G 25/16* (2006.01)
*G06F 17/11* (2006.01)
*G05B 19/418* (2006.01)

(52) U.S. Cl.
CPC ............ *G06F 9/3891* (2013.01); *G06F 17/11*
(2013.01); *G06K 2209/17* (2013.01)

(58) Field of Classification Search
CPC .......... G06T 2207/30128; G06T 7/001; G06T 7/0012; A01D 46/30; A01D 46/24; A01D 46/253
See application file for complete search history.

(56) References Cited

U.S. PATENT DOCUMENTS

| | | | | |
|---|---|---|---|---|
| 9,538,124 B2* | 1/2017 | Lejeune | .................. | A01G 2/00 |
| 10,175,362 B2* | 1/2019 | Redden | .................. | G01B 11/24 |
| 10,225,993 B2* | 3/2019 | Alexander | .......... | A01G 9/0299 |
| 10,438,343 B2* | 10/2019 | Baurer | .................. | A01G 22/00 |
| 10,716,265 B2* | 7/2020 | Alexander | ................. | B25J 5/02 |
| 2006/0213167 A1* | 9/2006 | Koselka | ............... | A01B 79/005 |
| | | | | 56/10.2 A |
| 2009/0322357 A1* | 12/2009 | Beaulieu | ................ | G01V 3/088 |
| | | | | 324/692 |
| 2014/0288850 A1* | 9/2014 | Avigdor | ................. | G05B 15/02 |
| | | | | 702/19 |
| 2014/0316557 A1* | 10/2014 | Jones | .................... | G05D 1/0287 |
| | | | | 700/226 |
| 2016/0120114 A1* | 5/2016 | Tsutsumi | ............... | A01G 9/086 |
| | | | | 47/66.5 |
| 2017/0030877 A1* | 2/2017 | Miresmailli | .............. | G06N 5/04 |
| 2017/0223947 A1* | 8/2017 | Gall | .................... | G01N 21/4738 |
| 2018/0092304 A1* | 4/2018 | Moore | .................. | B25J 9/1679 |
| 2018/0295783 A1* | 10/2018 | Alexander | ............ | G06T 7/0016 |
| 2018/0326464 A1* | 11/2018 | Antonini | ............... | C12M 41/36 |
| 2019/0239502 A1* | 8/2019 | Palomares | ........... | A01B 69/008 |
| 2020/0060106 A1* | 2/2020 | Lankford | ............... | A01G 25/16 |
| 2020/0093053 A1* | 3/2020 | Ehlert | .................... | G06Q 50/02 |
| 2020/0120886 A1* | 4/2020 | Geltner | .................. | A01G 22/05 |
| 2020/0281122 A1* | 9/2020 | Mor | ..................... | A01D 46/253 |

* cited by examiner

METHOD FOR SELECTIVELY DEPLOYING SENSORS WITHIN AN AGRICULTURAL FACILITY

CROSS-REFERENCE TO RELATED APPLICATIONS

This Application claims the benefit of U.S. Provisional Application No. 62/694,410, filed on 5 Jul. 2019, which is incorporated in its entirety by this reference.

This Application is related to U.S. patent application Ser. No. 15/852,749, filed on 22 Dec. 2017, which is incorporated in its entirety by this reference.

TECHNICAL FIELD

This invention relates generally to the field of agricultural systems and more specifically to a new and useful method for selectively deploying sensors within an agricultural facility in the field of agricultural systems.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
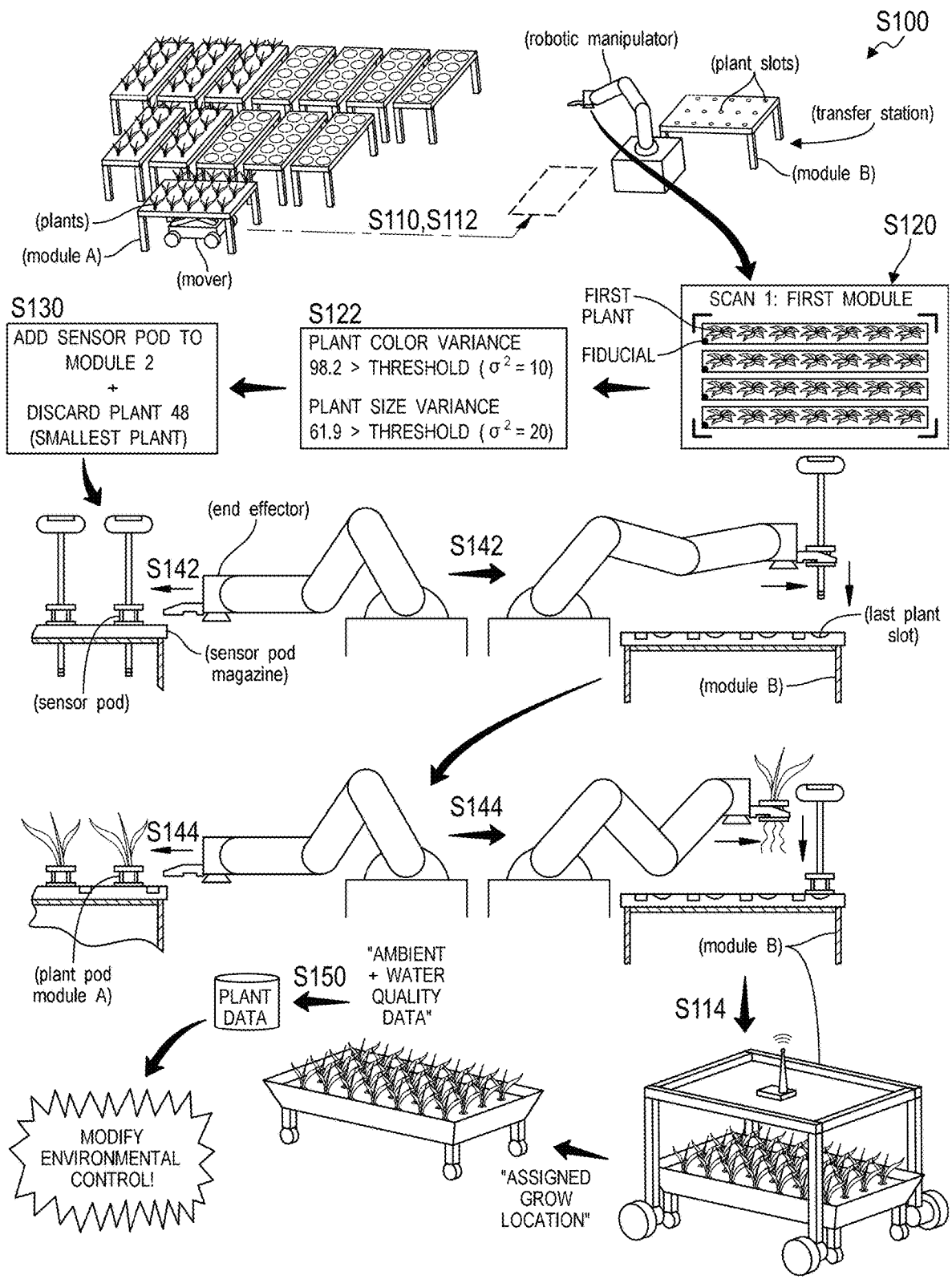
FIG. 1 is a flowchart representation of a method.
Figure 4:
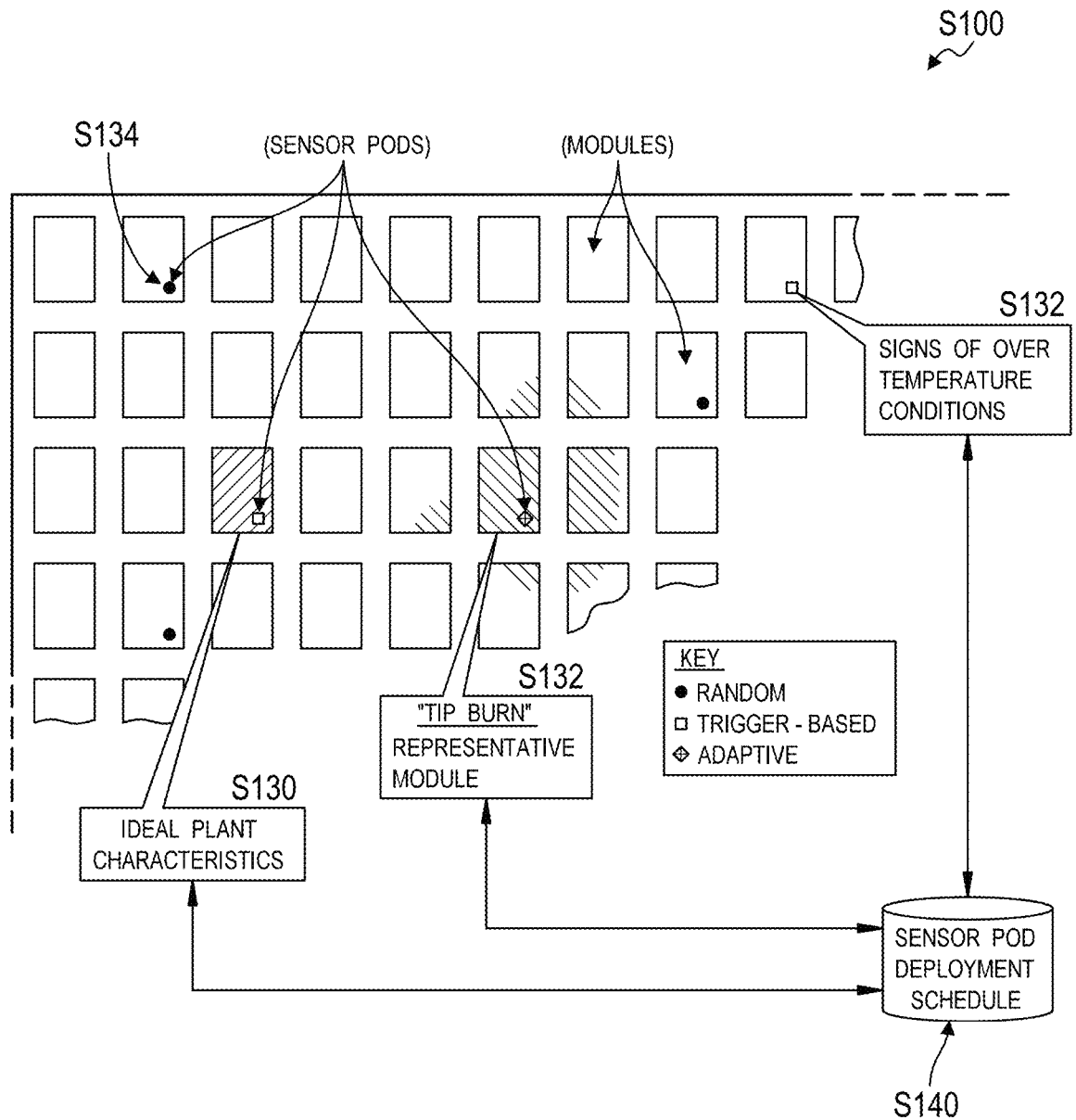
FIG. 4 is a graphical representation of one variation of the method.

As shown in FIGS. 1 and 4, a method S100 for selectively deploying sensors within an agricultural facility includes: accessing scan data of a set of modules deployed within the agricultural facility in Block S120; extracting characteristics of plants occupying the set of modules from the scan data in Block S122; selecting a first subset of target modules from the set of modules in Block S130, each target module in the set of target modules containing plants exhibiting characteristics representative of groups of plants occupying modules neighboring the target module; pseudorandomly selecting a second subset of target modules from the set of modules in Block S132; based on characteristics of plants occupying the set of modules, identifying a set of groups of plants exhibiting characteristics approximating a predefined trigger condition; selecting a third subset of target modules from the set of modules in Block S134, each target module in the third subset of target modules occupied by a group of plants in the set of groups of plants; for each target module in the first subset of target modules, the second subset of target modules, and the third subset of target modules, scheduling a robotic manipulator within the agricultural facility to remove a particular plant from a particular plant slot in the target module in Block S140 and load the particular plant slot with a sensor pod from a first population of sensor pods deployed in the agricultural facility in Block S142; and monitoring environmental conditions at target modules in the first subset of target modules, the second subset of target modules, and the third subset of target modules based on sensor data recorded by the first population of sensor pods in Block S150.

Figure 2:
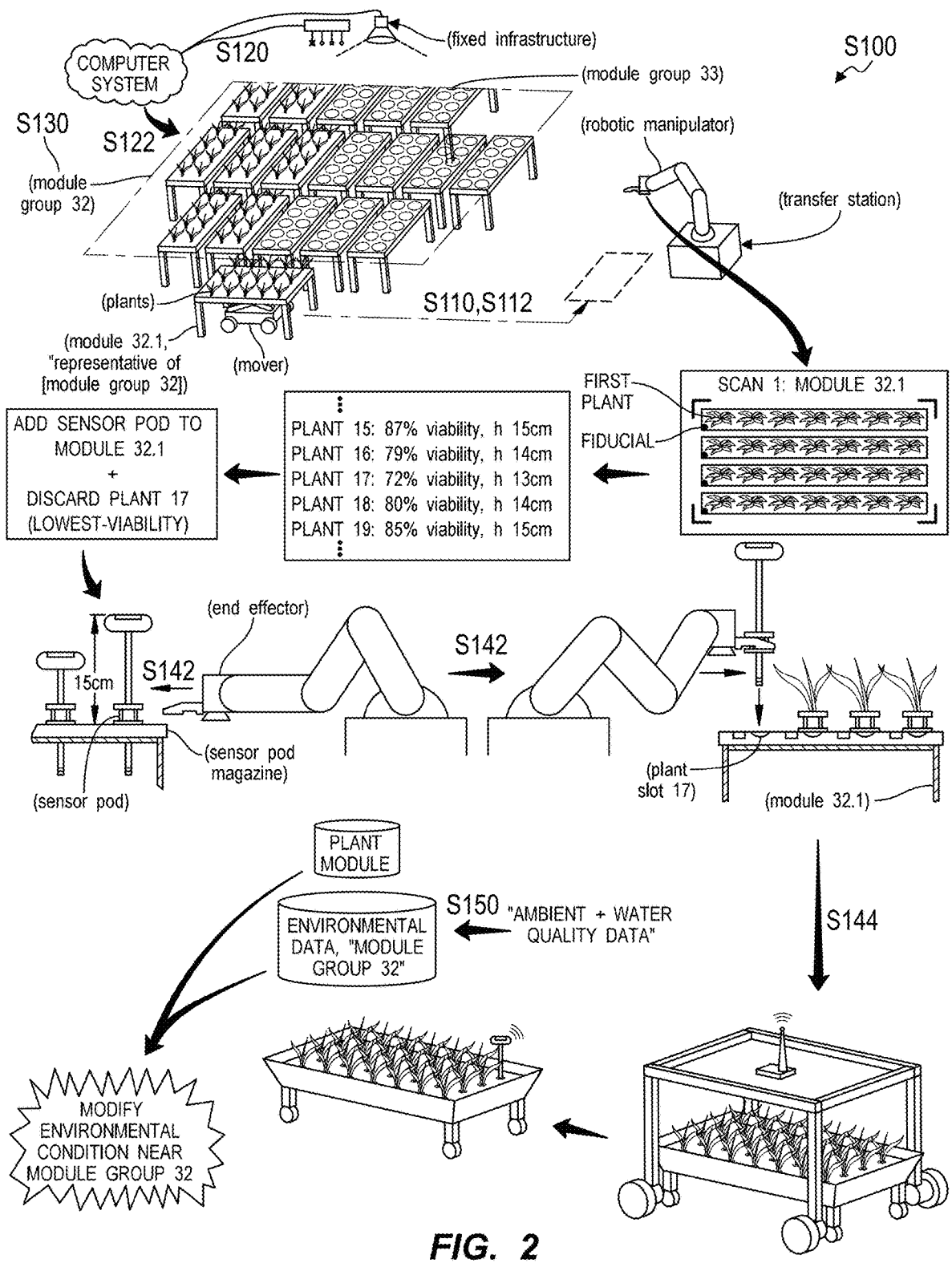
FIG. 2 is a flowchart representation of one variation of the method.

As shown in FIG. 2, one variation of the method S100 includes: accessing scan data of a set of modules deployed within the agricultural facility in Block S120; extracting characteristics of plants occupying the set of modules from the scan data in Block S122; selecting a first subset of target modules from the set of modules in Block S130, each target module in the set of target modules containing a group of plants exhibiting characteristics representative of plants occupying modules neighboring the target module; for each target module in the first subset of target modules, scheduling a robotic manipulator within the agricultural facility to remove a particular plant from a particular plant slot in the target module in Block S140 and load the particular plant slot with a sensor pod from a first population of sensor pods deployed in the agricultural facility in Block S142; and monitoring environmental conditions at target modules in the first subset of target modules based on sensor data recorded by the first population of sensor pods in Block S150.

Figure 5:
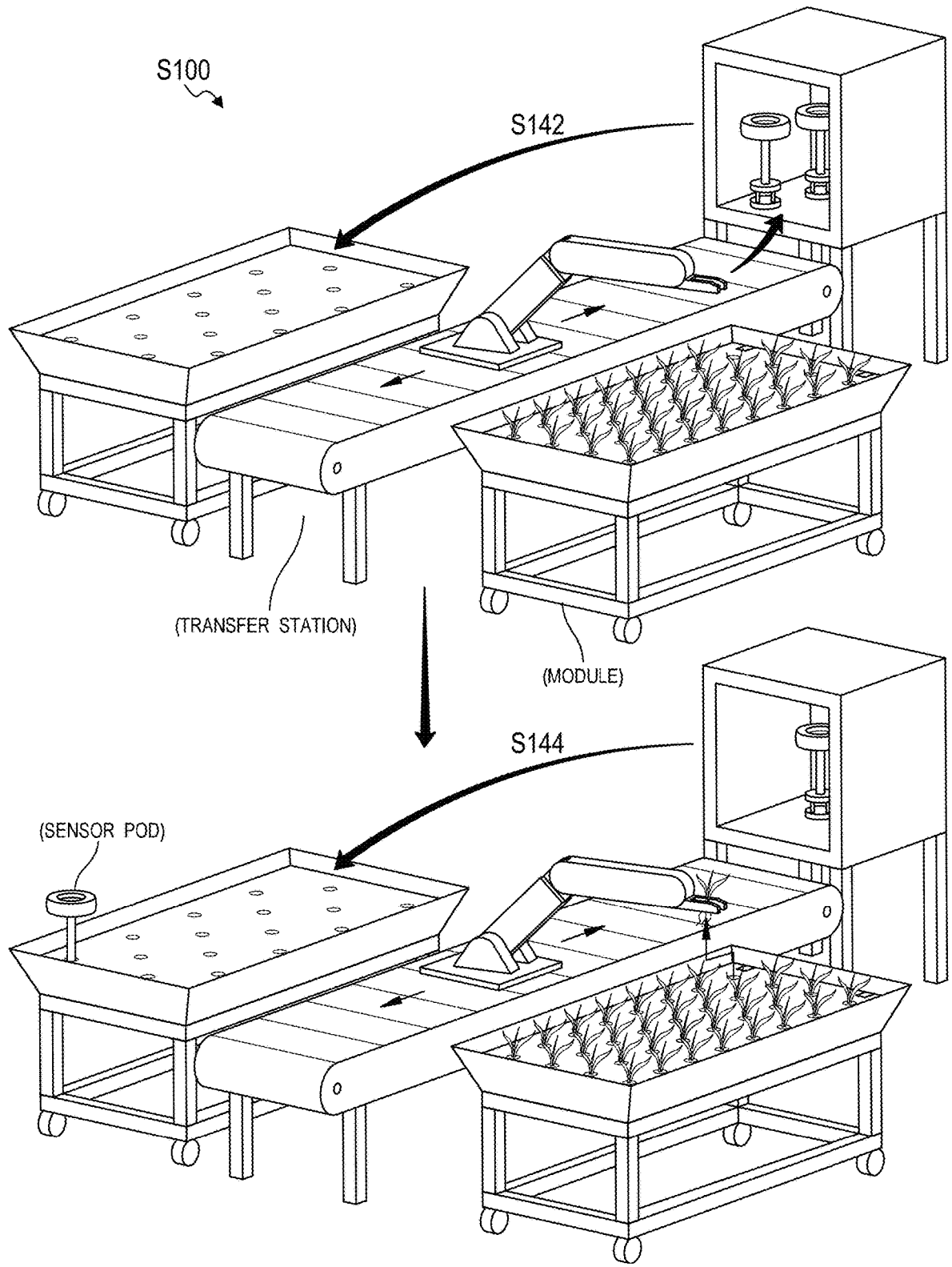
FIG. 5 is a flowchart representation of one variation of the method.

As shown in FIGS. 1 and 5, another variation of the method S100 includes: dispatching a loader to autonomously deliver a first module to a transfer station within the agricultural facility in Block S110, the first module defining a first array of plant slots at a first density and loaded with a first set of plants at a first plant growth stage; dispatching the loader to autonomously deliver a second module to the transfer station in Block S112, the second module defining a second array of plant slots at a second density less than the first density and empty of plants; recording a module-level optical scan of the first module at the transfer station in Block S120; extracting characteristics of the first set of plants from the module-level optical scan in Block S122; in response to characteristics of the first set of plants approximating a predefined trigger condition, triggering the robotic manipulator to load a sensor pod into a plant slot in the second module in Block S142; triggering the robotic manipulator at the transfer station to transfer a first subset of the first set of plants from the first module into open plant slots in the second module in Block S144; dispatching the loader to autonomously deliver the second module to a grow area within the alignment feature facility in Block S114; and detecting environmental conditions at the second module based on sensor data collected by the sensor pod in Block S150.

2. Applications

Generally, the method S100 can be executed by a system in conjunction with an agricultural facility (hereinafter the "facility") to selectively distribute a small number of sensor pods—such as containing environmental and water-quality sensors—to a small number of modules within a (much) larger corpus of modules populated with plants in various stages of development within the facility. The system can thus collect high-resolution, high-frequency environmental and/or water-quality data from this small number of sensor pods deployed across this small number of target modules in the facility and can leverage these sensor data: to inform adjustment of environmental and water conditions in and around these target modules in order to improve outcomes of plants occupying these target modules; to interpolate or extrapolate environmental and water conditions in and around other modules neighboring these target modules; and to inform adjustment of environmental and water conditions in and around these other modules in order to improve outcomes of plants in these modules not directly monitored with such sensor pods.

For example, the system can: detect ambient air temperature, ambient humidity, ambient light level, and ambient air flow rate at a first target module occupying a first location in the facility based on sensor data collected by a first sensor pod deployed in this first target module; similarly detect ambient air temperature, ambient humidity, ambient light level, and ambient air flow rate at a second target module— occupying a first location in the facility and offset from the first target module—based on sensor data collected by a second sensor pod deployed in this second target module; repeat this process for other target modules in other known locations throughout the facility; interpolate current ambient air temperature, humidity, light level, and air flow gradients throughout the facility based on discrete ambient data collected by these deployed sensor pods over time; isolate regions within the facility exhibiting air temperature, humidity, light level, and/or air flow deviations from target or average conditions at similar modules containing plants at similar growth stages according to these gradients; and selectively adjust cooling, (de)humidifier, artificial lighting, and fan settings throughout the facility in order to reduce such deviations in these regions in the facility and thus achieve greater consistency across plants growing within the facility.

Additionally or alternatively, the system can: access water quality data—such as water temperature, water level, dissolved oxygen, pH, and/or nutrient level—from sensor pods deployed to target modules throughout the facility; interpolate current water quality gradients throughout the facility based on discrete water quality data detected by these deployed sensor pods over time (e.g., based on a prediction or assumption that neighboring modules exhibit similar nutrient uptake and water evaporation and are maintained or refreshed according to similar schedules); isolate a cluster of modules within the facility exhibiting water-related characteristics that deviate from target or average conditions at similar modules containing plants at similar growth stages according to these gradients; and selectively prompt investigation or restoration of water conditions in this cluster of modules in order to reduce such deviations and thus achieve greater consistency of water-related characteristics across plants growing within the facility.

In addition to environment and water-quality sensors, a sensor pod can include a sensor configured to capture data representative of pest pressures (e.g., insects, mold, mildew) presenting on plants occupying adjacent slots in the same module, representative of pest pressures presenting on a trap plant occupying the sensor pod, or representative of pest presence on a surface (e.g., an insect trap card) mounted to the sensor pod. When the sensor pod is deployed to a module, the sensor pod (or the system) can derive presence and/or magnitude of pest pressures presenting at this module based on data captured by this "pest sensor." The system can then: aggregate such pest presence and/or magnitude data derived from data captured by pest sensors in sensor pods deployed to target modules at known locations within the facility into gradients of such pest pressures throughout the facility; isolate locations and intensities of such pressure presenting in the facility based on corresponding gradients; and selectively prompt actions to reduce these pressures or quarantine modules occupying locations exhibiting pressures by certain pests and/or above threshold pressure intensities. For example, the system can prompt systematic deployment of pest response pods containing beneficial insects to suppress pest insects, schedule application of mildew suppressants, schedule application of pesticides, or queue delivery to a quarantine arena for select clusters of modules in the facility based on these pest pressure gradients.

Furthermore, the system can: assemble these environmental, water-quality, and/or pest pressure gradients generated over time into timeseries exposure gradients for individual plants occupying known plant slots in modules at known locations in the facility over time; access in-process and outcome data for these plants, such as intermediate outcomes derived from scan data recorded at a transfer station when plants are moved between modules and final outcomes derived from scan data recorded at the transfer station when plants are harvested from these modules; and then implement artificial intelligence, deep learning, and/or machine learning techniques to generate and refine a model that links environmental, water quality, and pest pressure conditions at individual plants grown in the facility over time to their intermediate and final outcomes. The system can then implement this model to inform changes to environmental and water quality conditions, to inform tolerance or target ranges for these environmental and water quality conditions, and to inform responses to pest pressures for future plants grown in the facility.

Therefore, the system can selectively deploy sensor pods to target modules in the facility to support collection of high-resolution, high-frequency environmental, water quality, and/or pest pressure data at discrete locations in the facility and then extrapolate these data to other modules— not occupied by such sensor pods—in the facility to inform targeted adjustment of environment and water conditions and to inform targeted response to pest pressures that maintain or increase yield, plant quality, and consistency of plant crops produced at the facility over time.

2.1 Sensor Pod Allocation Schema

Generally, costs for acquiring, maintaining, calibrating, distributing, and recalling sensor pods within the facility may be non-negligible and variable over time/Furthermore, because a sensor pod occupies a plant slot that may otherwise be allocated to a plant, deployment of sensor pods into modules throughout the facility may decrease plant density per module in the facility and thus decrease throughput of the facility. Therefore, the system can implement Blocks of the method S100 to deploy many fewer sensor pods than modules within the facility and to intelligently deploy small numbers of sensor pods across a large population of modules within a facility according to trigger-based, adaptive, and random sensor pod allocation schema.

For example, the system can deploy a small number of sensor pods across: modules containing plants exhibiting positive, negative, or uncommon characteristics that compel collection of high-resolution data and further investigation (hereinafter "trigger-based" deployment); target modules in clusters of modules containing plants exhibiting positive, negative, or uncommon characteristics that compel collection of high-resolution data (hereinafter "adaptive" deployment); and randomly-selected modules not necessarily containing plants exhibiting positive, negative, or uncommon characteristics (hereinafter "random" deployment). The system can also regularly implement trigger-based, adaptive, and random deployment schema to redistribute sensor pods to the modules throughout the facility over time.

The system can therefore schedule selective deployment of sensor pods to target modules in the facility and then leverage data collected by these sensor pods to prompt actions that: protect against failures that may otherwise lead to poor outcomes for plants occupying an individual target module (i.e., according to trigger-based sensor pod deployment schema); protect against environmental failures in areas of the facility that may lead to poor outcomes in plants spread across a cluster of modules (i.e., according to adaptive sensor pod deployment schema); and increase likelihood of collection of data representative of a pressure in plants occupying a target module before these plants express this pressure in the form of a visible, physical change (i.e., according to random sensor pod deployment schema). The system can also schedule selective deployment of sensor pods to target modules in the facility to enable collection of data—according to trigger-based, adaptive, and random sensor pod deployment schema—that enable refinement of a plant model linking environment, water-quality, and pressure inputs to outcomes for plants grown in the facility.

2.2 Sensor Pod Interfacing

As described below, the system can include: a facility; modules configured to support plants during their growth and deployed throughout the facility; a transfer station including a robotic manipulator configured to autonomously move plants between modules of different types and to harvest fully-grown plants from modules; a mover configured to autonomously move modules between grow areas within the facility and the transfer station; plant pods configured to transiently support plants in plant slots within modules; sensor pods configured for transient (i.e.; temporary) installation into a plant slot in a module to collect relatively high-resolution ambient and/or water quality data in and around the module at relatively high frequency; and a local or remote computer system configured to control various actuators within the facility to assist growth of plants based on data collected from sensor pods and other sensors throughout the facility, to dispatch the mover to transfer modules to and from the transfer station, and to trigger the robotic manipulator to move plants between modules at the transfer station.

Generally, a sensor pod can define a form that enables the robotic manipulator to interface with both plant pods—each supporting an individual plant—and sensor pods via the same end effector and according to similar detection and navigation pathways, thereby enabling simple and robust interactions between the robotic manipulator and both plant pods and sensor pods. In particular, a sensor pod can include: a base defining a form factor similar to plant pods configured to support and locate plants within plant slots in modules deployed within the facility; water quality sensors extending below the sensor pod base and configured to detect qualities of water in a water tank below a plant slot; and ambient sensors extending above the sensor pod base and configured to detect ambient conditions above a plant slot. Because the sensor pod defines a form similar to that of a plant pod, a robotic manipulator may accurately, repeatably, and autonomously transfer both plant pods that contain individual plants and sensor pods that contain suites of sensors between standardized plant slots in modules deployed throughout an agricultural facility, thereby enabling operation within the facility, selective capture of high-resolution ambient and water-quality data, and reducing or eliminating reliance on human labor necessary to manage and maintain plants growing within the facility over time.

For example, the robotic manipulator can execute Blocks of the method S100 to: engage a target plant pod supporting a plant within a target plant slot within a first module; withdraw the target plant pod from the target plant slot; discard the plant; and then insert a sensor pod—exhibiting a form similar to that of the plant pod—into the target plant slot in the first module. A mover can then return the first module to its assigned location within a grow area of the facility. With the sensor pod now active and located in the first module, the sensor pod can regularly record local ambient and water quality conditions—such as air temperature, air speed, light level, relative humidity, water temperature, water level, dissolved oxygen, pH, and nutrient level—and wirelessly broadcast these data to a local or remote computer system. The computer system can then: inject these data into plant files associated with plants occupying the first module; trigger changes to growth inputs for this module (e.g., location in the facility, a nutrient schedule, a harvest schedule) based on these data; and/or refine a plant model that represents correlations between such ambient and water quality conditions around plants grown in the facility and the interim and final outcomes of these plants.

Furthermore, because a sensor pod is mobile and not integrated into or otherwise tied to one module and because the sensor pod defines a "standardized" physical interface for the robotic manipulator, the robotic manipulator can regularly remove the sensor pod from a module, autonomously recalibrate sensors in the sensor pod, clean or sanitize the sensor pod, and later install the sensor pod in a plant slot in another module.

(The method S100 is described herein as executed by a system within an agricultural facility to selectively replace a plant housed in a plant slot in a module with a sensor pod in order to collect water and ambient air data from in and near this module. However, modules within the agricultural facility can additionally or alternatively include dedicated sensor pod slots; and the system can execute Blocks of the method S100 to insert sensor pods into dedicated sensor pod slots in select modules over time in order to collect water and ambient air data from in and near these modules.)

3. System

As shown in FIG. 1, the method S100 can be executed by a system including: a computer system; a fixed sensor suite; an automated (or "autonomous") mover; and a robotic manipulator. The fixed sensor suite is connected to the computer system and is configured to regularly collect optical data (e.g., overhead digital photographic images) of multiple modules—each containing multiple plants—staged within a grow area of the facility and to collect ambient sensor data from over these modules, such as once per hour or once per second. The mover is connected to the computer system and configured: to navigate to single modules throughout the facility; to collect optical data from groups of plants in a single module and to collect water quality data from these modules, such as once per day or every other day; and to deliver single modules to the transfer station and to return modules to their assigned locations throughout the facility, such as once per two-week interval per module. The robotic manipulator is connected to the computer system, is located at a transfer station within the facility, and is configured to collect optical, weight, and/or other data from individual plants while moving plants between modules, such as from a nursery module to a finishing module.

In particular, the mover can be configured to automatically navigate throughout the facility to a particular location under or near a module, to couple to or lift the module, to navigate—with the module—to a transfer station within the facility, and to release (or "deposit") the module at the transfer station. While moving past other modules on its way to collecting a particular module for delivery to the transfer station, the mover can also collect optical and water quality data from these other modules. The robotic manipulator can be arranged near the center of the transfer station, and the mover can arrange a first module of a nursery type (e.g., containing a high density of plant slots) and a second module of a finishing type (e.g., containing a lower density of plant slots) adjacent the robotic manipulator at the transfer station in order to enable the robotic manipulator to navigate its end effector across both the full extent of plant slots in the first module and the full extent of plant slots in the second module. The mover can also deposit a third module of the finishing type to the transfer station, such as adjacent the second module, and the robotic manipulator can transition to transferring cleared plants from the first module to the third module once all plant slots in the second module are filled. The mover can then return the second and third modules to assigned grow areas within the facility, such as under a translucent roof and/or under artificial lighting.

The mover can also deliver a seeding tray to the transfer module, and the robotic manipulator can implement similar methods and techniques to check sizes and weights of plants in the seeding tray and to sequentially transfer plants from the seeding tray into the first module before the mover returns the first module to an assigned grow area within the facility. Alternatively, the system can include a second robotic manipulator arranged at a second transfer station within the facility, and the mover can deliver the first module and the seeding tray to the second transfer station, and the second robotic manipulator can transfer seedlings from the seeding tray into the first module.

Similarly, the (first) robotic manipulator at the (first) transfer station, the second robotic manipulator at the second transfer station, or a third robotic manipulator at a third transfer station within the facility can remove plants from the second and third modules of the finishing type (e.g., for manual or automated processing, such as removal of roots) and/or place plants from the second and third modules into packages (e.g., boxes, pallets) for distribution from the facility.

The method S100 is described below as executed by the system to automatically transfer lettuce through a sequence of seeding trays, nursery-type module, and finishing-type modules. However, the method S100 can be implemented in a greenhouse or other facility in conjunction with growing any other type of plant, such as fruit, vegetables, legumes, flowers, shrubs, or trees, etc.

3.1 Module

The system includes a set of modules configured to house a group of plants throughout a segment of the growth cycle of these plants (e.g., four weeks of a twelve-week grow-period). Each module can define a standard size (e.g., four feet in width by eight feet in length by four feet in height; two meters in width by five meters in length by one meter in height) and can include a number of plant slots matched to the segment of plant growth cycle associated with the module. For example: a seeding-type module can include 192 plant slots; a nursing-type module can include 48 plant slots (i.e., one-quarter as many as seeding-type modules); and a finishing-type module can include twelve plant slots (i.e., one-quarter as many as nursing-type modules); despite these modules defining the same overall size and geometry.

In particular, plants may be grown in modules arranged throughout the facility, wherein each module defines an array of plant slots configured to hold one plant (or a "bunch" of like plants, such as multiple basil plants) at a density suited to a stage of plant grown in the module. Young plants may have relatively small leaves covering a relatively small area such that these young plants require only a small grow volume; as these plants mature (e.g., to a "sprout" stage or through "thinning" and "rosette" stages), their leaves may grow to cover a greater area, thereby requiring a larger grow volume; as these plants mature further (e.g., through "early-heading," "mid-heading" and "mature-heading" stages), their leaves may develop more fully and thus cover a greater area up until a time that these plants are harvested, thereby necessitating an even larger grow volume. In order to maintain a relatively high throughput per floor area within the facility, the facility can be outfitted with modules of different types—that is, modules with different plant slot densities suited to various stages of plant growth and therefore to various size ranges of plants from seeding to harvest. For example, the facility can be outfitted with: seeding trays (or "seeding modules") defining a highest density of plant slots (e.g., 640 plant slots per 4-foot by 12-foot module) and configured to hold plants during a seeding stage; modules of a first type (e.g., a "nursery-type") defining a moderate density of plant slots (e.g., 170 plant slots per 4-foot by 12-foot module) and configured to hold plants during a sprout stage; and modules of a second type (e.g., a "finishing-type") defining a lowest density of plant slots (e.g., 40 plant slots per 4-foot by 12-foot module) and configured to hold plants during a finishing stage and up to harvest. By placing young plants first in modules with greatest plant slot densities and then transiting these plants to modules characterized by lower and lower plant slot densities as the plants increase in size and maturity, the facility can house and grow more plants per module on average and therefore achieve greater space efficiency (i.e., a number of plants per floor area within the facility).

In one implementation, a module includes: an open tray configured to contain a standing volume of water and nutrients; a cover arranged over the open tray and including a set of perforations, wherein each perforation defines a plant slot configured to receive and retain one plant (or one cluster of plants); and a stand configured to support the tray off of the ground. In the implementation: the open tray can define a standard rectangular geometry, as described above; and the lid can include a rectangular cover configured to float in water in the tray. For example, the lid can include: a rigid panel (e.g., nylon or aluminum sheet) defining an array (e.g., a linear grid array, a close-pack array) of plant slots; and floats extending across the underside of the rigid panel and exhibiting sufficient buoyancy and/or height to maintain an air gap between the top surface of water in the tray and the bottom surface of the lid when the array of plant slots in the lid are filled with plants, thereby maintaining exposure to air—and therefore oxygen—for upper root systems of these plants. Furthermore, in this example, because the lid floats on the water in the tray, the lid can ensure that roots of these plants remain in contact with water in the tray despite changes to the water level in the tray.

Furthermore, in this implementation, the module can include a set of optical fiducials arranged on the top surface of the lid and/or the tray and configured to indicate position, orientation, distance, type, and/or unique identity of the module. For example, the module can include: one optical fiducial (e.g., a unique barcode or quick-response code) arranged at each of three or four corners on the lid; three (identical) colored dots (e.g., yellow for nursery stage, red for finishing stage) arranged at corners of the lid or tray; or one optical fiducial adjacent each plant slot on the lid (e.g., a colored circle, square, or polygon of known geometry and dimension encircling each plant slot); etc.

However, a module can define any other structure or geometry and can define any other number or arrangement of plant slots.

3.2 Sensor Pod

Figure 3:
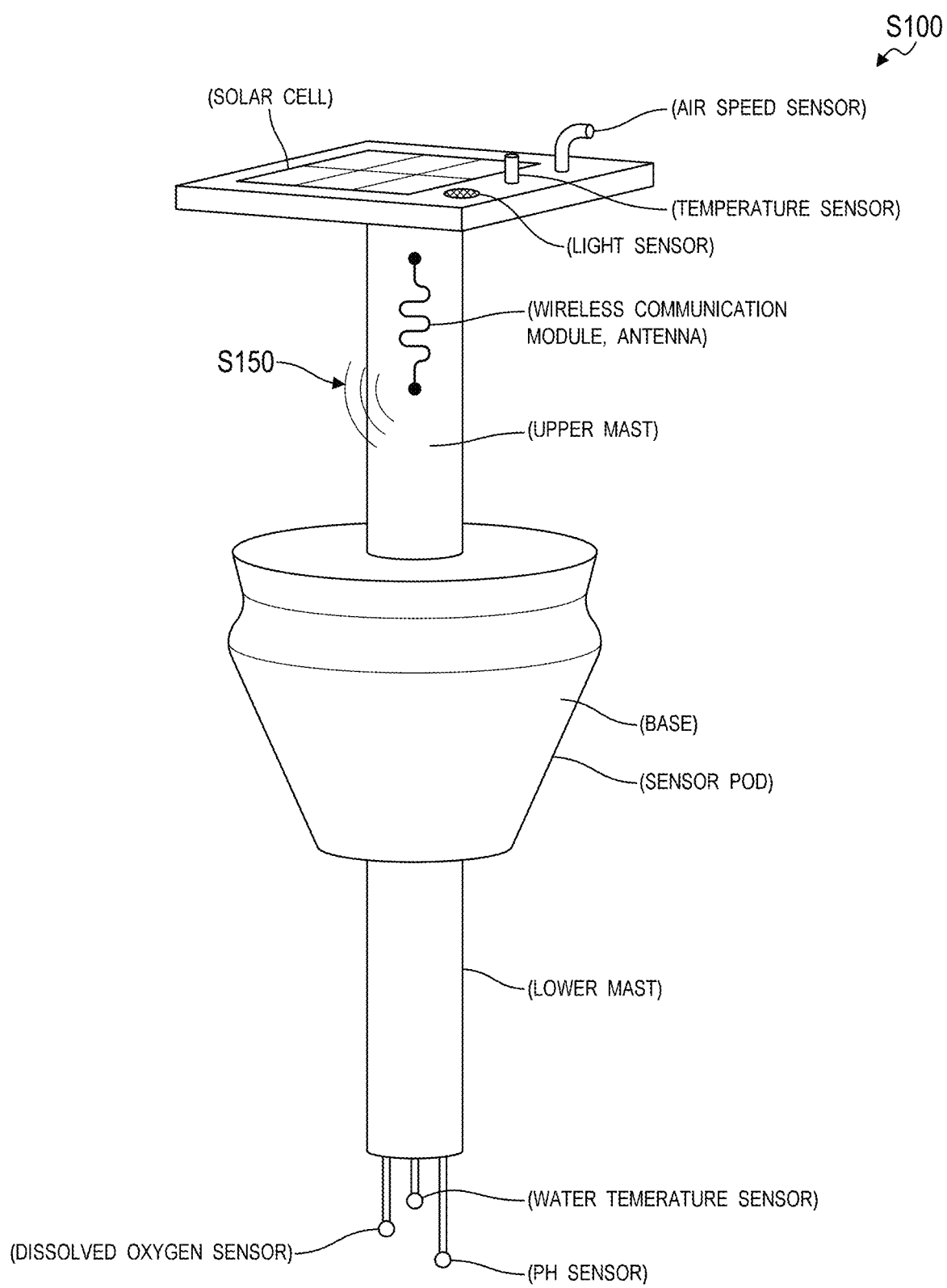
FIG. 3 is a schematic representation of a sensor pod.

As shown in FIG. 3, the sensor pod can include: a base defining a form factor similar to plant pods—that locate plants in plant slots in modules—and configured to insert into plant slots in modules deployed within the facility; water quality sensors extending below the sensor pod base and configured to detect qualities of water in a water tank below a plant slot; and ambient sensors extending above the sensor pod base and configured to detect ambient conditions above a plant slot. For example: the base can define a conical section including a small end of diameter less than the width of plant slots in these modules and including a large end of diameter greater than the width of plant slots in these modules; an end effector on the robotic manipulator can thus engage this conical section on the base to move the sensor pod into and out of a plant slot in a module. In this example, the water quality sensors (e.g., water temperature, water level, dissolved oxygen, pH, and/or nutrient level sensors) can be mounted on a lower mast extending from the small end of the base; and the ambient sensors (e.g., air temperature, air speed, light level, and relative humidity sensors) can be mounted on an upper mast extending from the large end of the base. The sensor pod can thus be loaded into a plant slot such that these water quality sensors are submerged into water within the module and such that the ambient sensors are located at approximately the same level as foliage of plants occupying this module, as shown in FIG. 1.

In one implementation, the upper mast is extensible (i.e., adjustable) and can be manually or automatically extended and retracted in order to vertically align sensors on the upper mast to the peak height or vertical center of leafy sections of plants in this module such that ambient data collected by these ambient sensors represent conditions around the leafy sections of these plants. Similarly, the lower mast can be extensible and can be manually or automatically extended and retracted in order to vertically align water quality sensors on the lower mast to the peak depth or vertical center of the root sections of plants in this module such that water quality data collected by these ambient sensors represent water conditions around the root sections of these plants.

For example, upon receipt of a module at the transfer station, the robotic manipulator can capture an optical scan of the module, and the system can estimate an average, maximum, or other representative height of plants occupying plant slots in the target module based on the optical scan. The robotic manipulator can then: retrieve a sensor pod from a magazine of sensor pods stored at the transfer station; adjust a height of a mast of the first sensor pod to approximately the representative height of the set of plants in the module; and then load the sensor pod into a particular plant slot in the module. By thus adjusting the height of the mast of the sensor pod according to height of other plants in the module, the robotic manipulator can locate a light level sensor in the sensor pod near tops of plants in this module such that the light level sensor is not obscured by these plants and such that a signal output by the light level sensor is representative of a true ambient light level proximal the module.

The sensor pod can also include a wireless communication module configured to broadcast ambient condition and water quality data back to a wireless hub, wireless gateway, or other computer system within the facility, such as once per ten-second interval over hours, days, or weeks in which the sensor pod is loaded into a module.

The sensor pod can further include a battery and/or a solar panel configured to power sensors and the wireless communication module in the sensor pod. For example: the solar panel can be arranged at the end of the upper mast opposite the base; the ambient sensors can be arranged around the solar panel; an antenna of the wireless communication module can be arranged along a length of the upper mast; and the wireless communication module and the battery can be arranged in the base of the sensor pod.

However, the sensor pod can define any other form and can include any other ambient and/or water quality sensors in any other arrangement.

3.2.1 Pest Detection Pod

In one variation, a sensor pod further includes: a trap receiver configured to retain an insect trap (e.g., a tacky yellow card); and a camera or other optical sensor facing the trap receiver and configured to capture a photographic image (or other optical scan data) of the insect trap while the sensor pod is deployed in a module. For example, when the sensor pod is retrieved from a module following a period of deployment, a used insect trap can be removed from the sensor pod, the sensor pod can be cleaned or sanitized, water-born and/or environmental sensors in the sensor pod can be calibrated, and a new insect trap can be loaded into the trap receiver. (The used insect trap can also be sealed, stored, and/or inspected further, such as to verify types of insects present on the insect trap in order to inform future deployment of pesticides or beneficial insects within the facility.) This refurbished sensor pod can later be loaded into another module, such as: responsive to detecting early signs of an insect pest in plants occupying the module or transferred into the module from an earlier-stage module (i.e., a trigger-based allocation of the sensor pod); responsive to pseudorandom selection of the module for insect detection (i.e., random allocation of the sensor pod); or responsive to detecting features of plants—in a cluster of neighboring modules containing the module—deviating from features of other plants at similar growth stages in other modules in the facility (i.e., adaptive allocation of the sensor pod).

Once deployed to the module, the sensor pod can trigger the camera to capture images of the insect trap, such as on a fixed interval (e.g., once per hour) or dynamically (e.g., at a rate proportional to ambient light level detected by a light level sensor in the sensor pod). An onboard processor integrated into the sensor pod can then: access a photographic image captured by the camera; implement computer vision techniques to detect the insect trap and to detect discrete blobs over the insect trap (e.g., black or brown blobs over a yellow background) in the photographic image; count a quantity of discrete blobs—likely to represent discrete insects—in the photographic image; and then transmit this insect count to the computer system via its integrated wireless communication module. In this example, the onboard processor can also extract sizes of these discrete blobs from the photographic image, generate a histogram of blob sizes and quantities, and return this histogram (or representative data) to the computer system. Additionally or alternatively, the onboard processor can implement computer vision and/or deep learning techniques (e.g., a convolutional neural network) to identify and distinguish particular types or classes of insects present on the insect trap based on features extracted from the photographic image (e.g., wasps, aphids, mites, moths, flies, beetles). Alternatively, the sensor pod can transmit each raw photographic image captured by its camera to the computer system, and the computer system can implement similar methods and techniques to extract a count, size, and/or type of insect present on the insect trap from these photographic images.

The computer system can then aggregate timestamped insect counts, sizes, and/or types extracted from photographic images recorded by the camera in the sensor pod, calculate a rate of change (e.g., rate of increase) of particular types or sizes of insects captured on the insect trap, and then estimate an insect pressure at the module based on the rate of change of captured insects and based on types, classes, or sizes of these insects (e.g., high insect pressure if the rate of change of captured harmful insects is high; low insect pressure if the rate of change of captured harmful insects is low). The computer system can: repeat this process to estimate insect pressure at other modules throughout the facility based on insect count, size, and/or type of data extracted from photographic images captured by cameras in other instances of the sensor pod deployed to these modules; and generate an insect pressure gradient throughout the facility based on these estimated insect pressures and locations of modules containing these sensor pods, such as by interpolating or extrapolating between current estimated insect pressures at known sensor pod locations throughout the facility. The computer system can then schedule selective deployment of pesticides or beneficial insects to target areas that correspond to highest pest pressures (or exhibit estimated insect pressures exceeding a threshold insect pressure) according to this insect pressure gradient. Furthermore, the computer system can specify a magnitude of this insect response—such as an amount of pesticide or a quantity of beneficial insects—deployed to these areas based on insect pressure magnitude indicated by this gradient.

For example, in this variation, the system can execute Blocks of the method S100 to: dispatch the mover to deliver a first module—occupied by a first set of plants—to the transfer station; trigger the robotic manipulator to record an optical scan of the first set of plants in the first module; detect a feature, in the optical scan, associated with an insect pressure; trigger the robotic manipulator to remove a first plant from a first plant slot in the first module and load the first plant slot with a first sensor pod—including an insect trap and an optical sensor facing the insect trap; dispatch the mover to deliver the first module to its assigned grow area in the agricultural facility; access an optical image recorded by the optical sensor in the first sensor pod; detect a quantity of insects depicted on the insect trap in the optical image; interpret a magnitude of insect pressure at the first module based on the quantity of insects; predict magnitudes of insect pressures at a first cluster of modules located proximal the first module; and selectively deploy pesticides or beneficial insects to these modules if their magnitudes of insect pressures exceed a threshold pressure.

Therefore, this sensor pod can collect environmental data, water quality data, and data representative of insects present on or near a module. Alternately, the system can include and selectively deploy: sensor pods containing environmental and water-quality sensors; and separate insect detection pods containing insect traps and cameras configured to capture images of these insect traps.

3.2.2 Insect Pod

In a similar variation, the system includes an insect pod: configured to transiently install in a plant slot in a module; and containing a cage, receptacle, or habitat configured to house beneficial insects that parasitize a harmful insect.

For example, a wheat grass can be inoculated with aphids. Wasps can then be introduced to the wheat grass and then parasitize these aphids to yield wasp mummies on the wheat grass. This wheat grass can then be loaded into the cage in the insect pod, and this "active" insect pod can then be loaded into a plant slot in a module—by the robotic manipulator—such as: if the system detects aphids on an insect trap in a sensor pod previously deployed to the module or to a neighboring module; or if features extracted from scan data of this module and/or neighboring modules indicate presence of aphids. Therefore, in this example, the system can execute Blocks of the method S100 to: dispatch a mover to deliver a first module—occupied by a first set of plants—from its assigned grow area in the agricultural facility to the transfer station; queue the robotic manipulator to record an optical scan of the first set of plants in the first module; detect a feature, in the optical scan, associated with presence of a particular insect in the first module; trigger the robotic manipulator to remove a first plant from a first plant slot in the first module and to load the first plant slot with an insect pod containing beneficial insects that parasitize the particular insect; and then dispatch the mover to deliver the first module to the assigned grow area in the agricultural facility.

Additionally or alternatively, the system can include a trap pod including a plant cup loaded with a "canary" or "sacrificial" plant that exhibits greater susceptibility to an insect or otherwise attracts an insect more than a primary crop grown in the facility. The system can then implement methods and techniques similar to those described above to selectively replace a plant—of the primary crop—in a module with a trap pod, such as: if the system detects an insect on an insect trap in a sensor pod previously deployed to the module or neighboring module; or if features extracted from scan data of this module and/or neighboring modules in the facility indicate presence of the insect.

3.3 Fixed Infrastructure

The system can include a fixed optical sensor (e.g., a color camera) arranged in a fixed location over modules in the facility and configured to regularly record images of multiple plants across multiple modules below. For example, the fixed optical sensor can be mounted to the ceiling of the facility or coupled to artificial (e.g., backup) lighting arranged over a grow area within the facility.

The system can also include a suite of fixed ambient sensors, such as including: an air speed sensor; a relative humidity sensor; a temperature sensor; and a light level sensor. For example, the suite of fixed ambient sensors can be arranged adjacent the fixed overhead camera over a grow area of the facility. The system can additionally or alternatively include multiple fixed suites of ambient sensors arranged throughout the grow area, such as suspended from ceiling or mounted on load-bearing columns within the facility and such as including one suite of fixed ambient sensors per square meters of grow area.

The fixed optical sensor can regularly record images of the grow area below; and sensors in the suite of fixed ambient sensors can regularly collect ambient data. For example, the fixed optical sensor can record an image of once per 10-minute interval; the suite of fixed ambient sensors can record air speed, humidity, air temperature, and light level values once per second; and the fixed optical sensor and the suite of fixed ambient sensors can return these data to the computer system via a wired or wireless connection.

3.4 Mover

The mover defines a vehicle that autonomously: navigates throughout the facility; selectively arranges itself over (or adjacent) modules; collects sensor data from in and around these modules (e.g., images of plants in a module, water quality data of water stored in the module, and/or ambient data around the module); delivers modules to the transfer station for transfer of plants into and out of these modules; and returns these modules to their assigned locations throughout the facility, such as responsive to commands issued by the computer system.

As described below, the computer system generates commands to transport specific modules to various locations throughout the facility, such as "module transfer requests" to transport modules between the grow area, transfer station, a cleaning station, a maintenance area, a dosing station, and/or a quarantine station. The computer system can also generate commands to collect optical, ambient, and/or water quality data from specific modules throughout the facility, such as "module scan requests" to record module-level images, local air temperature and humidity, and dissolved oxygen and water temperature in water stored in select target modules. The computer system can distribute these commands to the mover, and the mover can autonomously execute these commands.

In one implementation, the mover includes a gantry or boom. To engage a module, the mover can: navigate to and align itself over the module, such as based on optical fiducials applied to the module; extend the boom into contact with the module; trigger a latch on the boom to engage the module; and then retract the boom to lift the module. Alternatively, modules in the facility can include casters; to engage a module, the mover can navigate up to and align itself with the module, trigger a latch to engage the module, and then push or pull the module—on its casters—to another location within the facility (e.g., to the transfer station) prior to releasing the latch to disengage the module.

For the mover that is configured to autonomously navigate over a module, the mover can also include a downward-facing optical sensor. As the mover approaches a module, the mover can: detect an optical fiducial—located on the module—in the field of view of the downward-facing optical sensor; and navigate toward the module to locate this optical fiducial in a target position and/or orientation in the field of view of the downward-facing optical sensor in order to align itself to the module prior to triggering the boom or latch to engage the module. However, the mover can implement any other method or technique to engage and manipulate a module.

3.5 Transfer Station and Robotic Manipulator

The system also includes a transfer station arranged within the facility and defining a location at which plants are autonomously inspected and transferred from a first module (e.g., a nursery-type module) containing a higher density of plants slots to a second module (e.g., a finishing module) containing a lower density of plants slots. The system can also include a robotic manipulator: arranged at the transfer station; defining a multi-link robotic manipulator that is sufficiently mobile to reach each plant slot in a module temporarily positioned at the transfer station; including an end effector configured to engage plant cups supporting plants in this module; and/or including an optical sensor (e.g., a multi-spectral camera, or a stereoscopic camera, etc.) configured to record plant-specific images of plants in these modules, as described below.

In particular, the robotic manipulator functions to transfer plants between a first module (e.g., a nursery-type module) exhibiting a first density of plant slots to a second module (e.g., a finishing-type module) exhibiting a second density of plant slots less than the first density. By autonomously moving plants from high-density modules to lower-density modules, the robotic system can ensure that plants have sufficient access to light, water-borne nutrients, and space to continue growing over time. While sequentially transferring single plants between modules, the robotic manipulator can also collect optical and numerical-point data from each, singular plant.

For example, the mover can deliver a nursery-type module to the robotic manipulator at a first time to receive a set of seedlings from a seeding tray; when transferring seedlings into the nursery-type module, the robotic manipulator can record images and weight data for these seedlings. The mover can then return the nursery-type module to its assigned location within the facility. Two weeks later, the mover can return the nursery-type module to the robotic manipulator; the robotic manipulator can then collect images and weight data from these plants while transferring these plants from the nursery-type module to a finishing-type module. The mover can then return the finishing-type module to its assigned location within the facility. Two weeks later, the mover can return the finishing-type module to the robotic manipulator; the robotic manipulator can then collect images and weight data from these plants while transferring these plants from the finishing-type module into boxes for final processing, packaging, and shipment from the facility. The robotic manipulator can therefore collect high-resolution image and weight data from plants at a low frequency (e.g., once per two-week interval); the computer system can then write these high-resolution, low frequency data to plant records assigned to corresponding plants.

In one implementation, the robotic manipulator includes an optical sensor (e.g., a 2D or 3D color camera or multi-spectral imager) integrated into or otherwise coupled to the end effector. Upon arrival of a first module at the transfer station, the robotic manipulator can navigate to a position that orients the articulable optical sensor over the first module and then trigger the articulable optical sensor to record a single, 2D photographic image (or "optical scan") of all plants in the first module. Alternatively, upon arrival of the first module, the robotic manipulator can: navigate the articulable optical sensor through multiple preset positions, such as one position over each plant slot in the module; and record a 2D photographic image through the articulable optical sensor at each of these positions. The system can then extract characteristics plants in the module from these images, such as a size, color, foliage density or area, geometry, indicators of pest presence, "health," and/or "visual appeal" of each plant, as described in U.S. patent application Ser. No. 15/852,749, which is incorporated in its entirety by this reference.

4. Module Scheduling and Delivery

During operation, the system schedules (or queues, dispatches) the mover to collect a first module from its location in a grow area of the facility and to deliver the first module to a transfer station within the facility, as shown in FIGS. 1 and 2. For example, during a module transfer cycle, the mover can: navigate to a location within the facility to which the first module was last delivered; position itself under (or over) the first module; actuate an elevator or latch to lift the first module off of the floor or to otherwise engage the first module; navigate to a first module docking location on a first side of the robotic manipulator at the transfer station; and then lower the elevator or release the latch to return the first module to the floor at the first module docking location, as shown in FIG. 1.

The system can similarly schedule the mover to deliver a second module to the transfer station, such as a second module containing a lower density of plant slots than the first module. The mover can then implement methods and techniques similar to those described above to retrieve the second module (from a cleaning station following harvest of a last batch of plants form the second module) and to deposit the second module at a second docking location at the transfer station, such as adjacent the robotic manipulator—opposite the first module docking location—at the transfer station. For example, the system can: dispatch the mover to autonomously deliver a second module—defining a second array of plant slots at a second density less than the first density and empty of plants—to the transfer station (e.g., to a second module docking location on a second side of the robotic manipulator opposite the first module docking location at the transfer station) for loading with viable plants from the first module; dispatch the mover to autonomously deliver a third module—defining a third array of plant slots at the second density—to the transfer station for loading with viable plants from the first module once plant slots in the second module are filled; and dispatch the mover to autonomously deliver a fourth module—defining a fourth array of plant slots at the first density—to the transfer station in Block S114 for loading with undersized or otherwise lower-viability plants from the first module.

In one implementation, the system queues the mover to deliver modules to the transfer station—for transfer of plants from these modules into later-stage modules characterized by lower plant slot densities or for harvest of plants from these modules—according to a fixed schedule for a plant type or varietal occupying these modules. For example, for a lettuce on an eight-week grow cycle, the system can schedule the mover to: deliver a seeding module to the transfer station for transfer of plants from the seeding module into a nursery-type module two weeks after the seeding module was seeded; deliver this nursery-type module to the transfer station for transfer of plants from the nursery-type module into a heading-type module two weeks after the nursery-type module was loaded with these plants; deliver this heading-type module to the transfer station for transfer of plants from the heading-type module into a finishing-type module two weeks after the heading-type module was loaded with these plants; and then deliver this finishing-type module to the transfer station for harvest of these plants two weeks after the finishing-type module was loaded with these plants.

Additionally or alternatively, the system can: access scan data (e.g., photographic images)—depicting modules deployed to grow areas throughout the facility—recorded by fixed sensors in the facility; access scan data—depicting these modules—recorded by sensors in the mover as the mover navigates autonomously throughout the facility; detect and extract characteristics (e.g., leaf area, height, weight, plant quality) of plants depicted in these photographic images or other scan data; and then estimate growth stages of these plants based on these characteristics. The system can then dynamically schedule the mover to deliver modules to the transfer station—for transfer of plants from these modules into later-stage modules or for harvest of plants from these modules—based on growth stages of plants thus derived from these scan data.

5. Plant Transfer Cycles

Upon receipt of a first module containing plants at a first (estimated or predicted) growth stage and upon receipt of a second module defining an array of plant slots configured for a next growth stage for these plants, the robotic manipulator can execute a sequence of plant transfer cycles to sequentially transfer plants from the first module to the second module.

In one implementation, when transferring plants from the first module into the second module, the robotic manipulator can: locate the optical sensor over the first module; detect the first module (e.g., an optical fiducial on the first module) in the field of view of the optical sensor; navigate the optical sensor over the second module; detect the second module (e.g., a similar optical fiducial on the second module) in the field of view of the optical sensor; calculate a path between a first plant slot in the first module and a last plant slot in the second module; navigate the end effector toward the first module to engage a first plant in the first plant slot in the first module; retract the first plant from the first plant slot along the calculated path; (record a weight of the first plant, such as via a load cell interposed between the end effector and an end of the robotic manipulator;) (locate the first plant in an optical inspection station near the touch sensor for recordation of a high-resolution 2D or 3D scan of the first plant;) and navigate the end effector along the path to insert the first plant into the last plant slot in the second module. The robotic manipulator can repeat this process to transfer a second plant in the first module into a second-to-last plant slot in the second module, to transfer a third plant in the first module into a third-to-last plant slot in the second module, and to transfer a fourth plant in the first module into a fourth-to-last plant slot in the second module, etc. until the second module is filled with plants.

Thus, by sequentially transferring plants from the first module into the second module during a scheduled plant transfer cycle, the robotic manipulator can sequentially gain access to each plant slot in both the first and second modules and thus remove a first sensor pod from any plant slot in the first module and install a second sensor pod into any plant slot in the second module.

6. Deployment of Sensor Pods During Scheduled Plant Transfer Cycle

Furthermore, if the system flags a module to receive a sensor pod when plants are transferred (e.g., from an earlier-stage module) into this module, the robotic manipulator can: retrieve a sensor pod from a sensor pod magazine—containing cleaned and calibrated sensor pods—located near the transfer station; and load the sensor pod into a target plant slot in this module, such as before, after, or while loading plants into all other plants slots in the module.

In one implementation, when loading a sensor pod into a module, the robotic manipulator locates the sensor pod in a plant slot proximal a lateral and longitudinal center of the module, thereby minimizing distances from sensors in the sensor pod to plants in this module and thus enabling the sensor pod to collect ambient and water quality data that may represent an average of ambient and water quality conditions experienced by plants occupying this module.

Alternatively, if a calibration duration of the sensor pod (i.e., a period of time over which sensors in the sensor pod may remain within a calibration range or exhibit less than a threshold drift) is less than a duration of time from placement of the sensor pod into the module and a next scheduled plant transfer cycle of plants out of the module and/or if the sensor pod is scheduled to be removed from this module prior to this next scheduled plant transfer cycle, the robotic manipulator can instead insert the sensor pod into a plant slot on a periphery of the module. For example, the robotic manipulator can insert the sensor pod into a plant slot on one of four corners of the module or into a plant slot along a long edge of the module facing the transfer station such that the robotic manipulator can later access and remove the sensor pod from the module without removing or otherwise disturbing other plants in this module.

6.1 Dynamic Plant Replacement Selection

In this implementation, to make room for the sensor pod, the robotic manipulator can remove a plant from a plant slot in the module and either discard the plant or transfer the plant into a second holding module at the transfer station. For example, the robotic manipulator can record an optical image of the module upon arrival at the transfer station. The system can then process this optical image to identify a smallest, lowest-viability, least-healthy, or least-attractive plant in a perimeter plant slot in the module or in a plant slot along an edge of the module nearest the robotic manipulator and flag this plant for culling. Accordingly, the robotic manipulator can: navigate the end effector to this plant slot; engage the plant; remove the plant from the module; dispense the plant into a waste or compost bin; retrieve a sensor pod from a sensor pod cartridge or holding area at the transfer station; and insert this sensor pod into the open plant slot.

6.2 Fixed Plant Slot Location for Sensor Pods

In another implementation, the system can specify default sensor pod locations for all modules, such as a top-right plant slot (e.g., a "first" plant slot) and a bottom-left plant slot (e.g., a "last" plant slot) in all modules. In this example, the system can designate a module to receive a sensor pod as a replacement for a plant currently occupying the module and trigger the mover to deliver the module to the transfer station. Upon arrival of the module at the transfer station, the robotic manipulator can: remove a first plant from a nearest of the first or last plant slot in the module; load the first plant into a holding module currently located at the transfer station; and load a sensor pod into the open plant slot. (In this example, when a second plant less viable than the first plant is later detected in another module delivered to the transfer station, the robotic manipulator can replace this second plant with the first plant. Alternatively, the system can continue to load the holding module with plants selectively removed from other modules, and the mover can return the holding module to a grow area in the facility once the holding module is sufficiently full of plants.)

However, the system can implement any other method or technique to replace a plant with a sensor pod outside of a scheduled plant transfer cycle involving the module.

7. Transfer of Sensor Pod During Scheduled Plant Transfer Cycle

In one variation, if the system designates a sensor pod to stay with a group of plants moving from a first, earlier-stage module to a second, later-stage module during a plant transfer cycle, the robotic manipulator can implement similar methods and techniques to transfer both this group of plants and this sensor pod from the first module into the second module.

Alternatively, if upon transfer of a module—containing a sensor pod—to the transfer station during a scheduled plant transfer cycle the system determines that plants in the module have not met trigger conditions for transfer to a later-stage module, the system can trigger the robotic manipulator to: remove the sensor pod from a particular plant slot in the module; load the sensor pod into a magazine of "used" sensor pods awaiting cleaning and recalibration; retrieve a second sensor pod—previously cleaned and recalibrated—from a magazine of refurbished sensor pods; and load this second sensor pod into the particular plant slot in the module before the mover returns the module to its assigned location in the facility.

8. Sensor Pod Deployment Outside of Plant Transfer Cycles

In another variation, the robotic manipulator can additionally or alternatively load a sensor pod into a plant slot in a module outside of a scheduled plant transfer cycle for this module. In particular, the system can select a module for enhanced monitoring at random or based on plant characteristics extracted from data collected by fixed infrastructure in the facility and/or from data collected by the mover while autonomously navigating throughout the facility. Accordingly, the system can dispatch the mover to deliver this module to the transfer station for temporary installation of a sensor pod.

8.1 Module Manipulation Outside of Scheduled Plant Transfer Cycles

In one implementation, the system queues the mover to deliver modules from a grow area to the transfer station for scanning by the robotic manipulator during periods in which a low frequency of plant transfer cycles are scheduled at the transfer station. For example, upon receipt of a module during this period, the robotic manipulator can scan plants occupying these modules before the mover returns the module—with plants generally undistributed—back to its assigned location in the grow area. The system can then process these scan data to: derive characteristics (e.g., size, quality, and/or pest pressure) of these plants; revise an estimate of a current growth stage of these plants based on these characteristics; and update a scheduled plant transfer cycle for this module based on the current growth stage of these plants.

In particular, plants in modules in different locations throughout the facility may grow at different rates due to varying amounts of sunlight exposure. Therefore, during periods in which a low frequency of plant transfer cycles are queued or pending at the transfer station, the system can: prompt the mover to deliver modules to the transfer station to collect high-resolution scans of plants in these modules; update assessments of growth stages of groups of plants occupying individual modules based on these high-resolution scans; and adjust scheduled plant transfer cycles for these modules accordingly—even if the robotic manipulator does not move or otherwise interface with these plants during these scan cycles.

Furthermore, in this variation and as described herein, the system can process scan data of plants in a module in (near) real-time, detect trigger conditions for collecting higher-resolution environmental and water quality data from this module, and selectively queue the robotic manipulator to replace a plant in the module with a sensor pod.

9. Sensor Pod Allocation

The system can designate segments of a population of sensor pods deployed in the facility to trigger-based, adaptive, random, and backup allocation to modules throughout the facility, as shown in FIG. 4.

For example, the facility can house nursery-type modules containing 48 plant slots each and 4000 finishing-type modules containing twelve plant slots each for a total of 5000 modules and capacity of up to 96,000 plants in nursery and finishing stages. In this example, the facility can be outfitted with 200 sensor pods, including: 60 sensor pods designated for trigger-based allocation; 40 sensor pods designated for adaptive allocation; 60 sensor pods designated for random allocation; and 40 sensor pods designated for backup allocation.

9.1 Trigger-Based Sensor Pod Allocation During Plant Transfer Cycle

During operation, the system can regularly dispatch the mover to transfer nursery-type and finishing type modules from a grow area in the facility to the transfer station. Upon arrival of a first, nursery-type module at the transfer station, the robotic manipulator can collect high-resolution data—such as optical scan and weight measurements—of plants in this first module, such as while transferring these plants from the first module into finishing-stage modules. The system can scan these plants for positive or negative triggers for enhanced ambient and water condition tracking, such as presence of: consistent target characteristics (e.g., target size, color, foliage density, and/or shape) for all plants in the module for their current growth stage; inconsistent characteristics (e.g., high variance in size, color, foliage density, shape) of plants in the module; or chemical burns, heat burns, or indicators of pest presence in these plants. If the system thus detects a positive or negative trigger for further data collection from these plants, the system can flag this set of plants for enhanced ambient and water condition tracking. Accordingly: the robotic manipulator can exchange an individual plant in a second, finishing-stage module with a sensor pod; the mover can return this second module to its assigned location in the facility; and the robotic manipulator can later remove the sensor pod from the second module when enhanced tracking is no longer needed at the second module, at the conclusion of a preset calibration period for the sensor pod, or when harvesting plants from the second module.

In one example shown in FIG. 1, a first nursing-type module can include 48 plants slots loaded with 48 plants. Once these plants reach a target growth stage or a target level of maturity (such as determined by the system based on optical data collected by fixed overhead sensors in the grow area or by sensors arranged on the mover), the system can dispatch the mover to deliver the first module and a set of four finishing-type modules—each containing twelve empty plants slots—to the transfer station, and the robotic manipulator can then record optical images of plants in the module upon receipt at the transfer station. The system can then derive characteristics of these plants from these optical images and selectively flag these plants currently stored in this first module for enhanced monitoring based on their characteristics.

In this example, the system can flag these plants in the first module for enhanced monitoring upon transfer into finishing-stage modules: if variance of characteristics (e.g., size, color, weight, geometry, symmetry) of plants in the first module exceeds a preset threshold; if plants in the first module exhibit characteristics within a threshold difference from predefined "ideal" plant characteristics; if characteristics of plants in the first module fall between characteristics of past plants with known positive outcomes and past plants with known negative outcomes; if a characteristic of plants in the first module differs from characteristics of past plants grown in the facility by more than a threshold difference; or if characteristics of plants in the first module are sufficiently similar to a combination of characteristics previously flagged by the system for further investigation (e.g., to refine and improve a plant model, such as described above). In this example, the system can also modify these thresholds or trigger values based on a quantity of sensor pods designated for trigger-based allocation still available at the transfer station, such as by increasing these thresholds as the number of available sensor pods decreases.

If the system thus confirms that plants in the first module meet one of these trigger conditions, the system can flag one of the finishing-type modules—scheduled to receive plants transferred out of the first module—to receive a sensor pod. For example, the system can identify a particular plant—in the first module—to cull (i.e., discard, such as a smallest plant or a least visually-attractive plant) to make room for a sensor pod in the four finishing-type modules. In this example, the system can: derive a viability score for each plant in the module based on characteristics of these plants extracted from global or module-level scan data, such as described in U.S. patent application Ser. No. 15/852,749; and then flag a particular plant—characterized by a lowest viability score in the set of plants occupying the module—for replacement with a sensor pod. The robotic manipulator can then: sequentially transfer twelve plants into plant slots in each of the first three finishing-type modules; sequentially transfer eleven plants into plant slots in the fourth finishing-type module; insert a calibrated sensor pod into a last plant slot in the fourth finishing-type module; and discard the particular plant flagged for culling. The system can then dispatch the mover to return the four finishing-stage modules to the grow area.

In this example, the system can also: segment plants in the first module into four groups based on similarities of characteristics or features of these plants, such as size, weight, color, and/or geometry; assign each group of plants to one of the four finishing-type modules; and flag a particular group in these four groups of plants and the corresponding finishing-type module for enhanced monitoring via a sensor pod, such as a group containing lowest-viability or smallest plants. For example, the system can: extract a characteristic of plants in the first module from an optical scan of the first module; define a first group of plants exhibiting a first range of the characteristic (e.g., a first size, color, or geometry range); define a second group of plants exhibiting a second range of the characteristic distinct from the first range of the characteristic; and then assign a sensor pod to the first group of plants in response to the first range of the characteristic deviating from a target characteristic for plants at this growth stage more than the second range of the characteristic. The system can similarly define a third group and a fourth group of plants in the first module. The robotic manipulator can then: discard a lowest-viability plant from the first group of plants while loading plants in each distinct group into its assigned finishing-type module; and load a sensor pod into an empty plant slot in a first finishing-type module containing the first group of plants.

However, if the system fails to identify a preset trigger condition in plants in the first module (or in one group of plants in the first module), the system can withhold sensor pods from these finishing-type modules.

Therefore, in this implementation, the system can selectively load a sensor pod into a particular module during a scheduled plant transfer cycle of plants from an early-stage module into the particular module based on characteristics of these plants extracted from optical images or other data collected by the robotic manipulator during this scheduled plant transfer cycle.

9.2 Ad Hoc Trigger-Based Sensor Pod Allocation

In a similar implementation, the system can: access lower-resolution optical images of modules—arranged throughout the facility—recorded by fixed infrastructure in the facility and/or by the mover while autonomously navigating throughout the facility; implement methods and techniques described above to extract characteristics of plants arranged in these individual modules; and rank, prioritize, or flag these individual modules for candidacy for enhanced monitoring. For example, the system can rank a module for enhanced monitoring via a sensor pod based on: similarity of characteristics of plants in a module detected in a photographic image—recorded by fixed infrastructure or the mover—to predefined "ideal" plant characteristics; intensity of colors indicating chemical, heat, or light burns in a region of the photographic image representing the module; or intensity of features correlated with pest presence in the region of the photographic image representing the module; etc. such as relative to other modules in the facility.

The system can then trigger the mover to deliver a highest-ranked module in this set to the transfer station; and the robotic manipulator can replace a plant in this module with a sensor pod. The system, mover, and robotic manipulator can repeat this process until available sensor pods currently designated for trigger-based allocation are deployed.

9.3 Sensor Pod Allocation: Adaptive

The system can implement similar methods and techniques to extract characteristics of plants occupying clusters of modules in the facility, such as from optical images recorded by fixed infrastructure, by the mover, and/or by the robotic manipulator. The system can then distribute sensor pods within a cluster of modules containing plants exhibiting characteristics of interest (or predicted to yield a certain outcome based on these characteristics) in order to access higher-resolution environmental and water quality data for some of these modules, which may enable the system to interpolate ambient and water quality exposure of other plants in these clusters with great accuracy.

In this implementation, the system can: isolate a cluster of modules containing plants that exhibit deviations from other plants growing in the facility along one or more dimensions, such as greater probability of pest pressure, color differences, more pronounced heat burns, smaller plant sizes, etc.; select a target module in this cluster; and dispatch the mover to deliver this target module to the transfer station. For example, the system can access a set of optical images recorded by a set of fixed sensors arranged over a grow area within the agricultural facility and implement computer vision techniques (e.g., edge detection, template matching, deep learning) to detect a boundary of each module in the set of modules based on features extracted from this set of optical images. The system can then: detect a first group of plants within a boundary of a first module in the set detected in these optical images; derive a first magnitude of a particular plant characteristic (e.g., color, size, geometry, symmetry, leaf area, or sign of biotic or abiotic pressure) of the first group of plants in this first module based on features extracted from the set of optical images; and repeat this process for each other module in this set. The system can then segment this set of modules into discrete groups of neighboring modules, wherein each group of neighboring modules includes modules that contain groups of plants exhibiting similar magnitudes of the particular plant characteristic. In this example, the system can implement clustering techniques (e.g., k-means clustering techniques) to isolate a quantity of contiguous, discrete groups of neighboring modules equal to a quantity of sensor pods designated for adaptive allocation. The system can then: select one target module—for each group of neighboring modules—exhibiting a magnitude of the particular plant characteristic representative of this characteristic within its group; and dispatch the mover to (sequentially) deliver each of these target modules to the transfer station for loading with a sensor pod in the population of sensor pods designated for adaptive allocation.

In a similar example, the system implements: computer vision techniques to detect a leaf area (e.g., area of plant foliage) of plants occupying a set of plants depicted in a set of optical images recorded by fixed and/or mobile infrastructure in the facility; extracts a gradient of plant characteristics from this leaf area; and implements clustering techniques to isolate a quantity of contiguous, discrete subareas of plant foliage equal to a quantity of sensor pods designated for adaptive allocation, wherein each subarea of plant foliage exhibits low plant characteristic variance(s), such as minimum color, leaf area, and geometric variance. The system can then: calculate a centroid of each subarea of plant foliage; project the centroid of each subarea of plant foliage onto a map of module locations in the facility; and flag each module that overlaps a centroid of a subarea of plant foliage for allocation of a sensor pod from this quantity of sensor pods designated for adaptive allocation. Accordingly, the system can then dispatch the mover to (sequentially) deliver each of these target modules to the transfer station for loading with a sensor pod.

Upon arrival of a target module at the transfer station, the robotic manipulator can: scan the target module; identify a particular lowest-viability plant or an "average" plant located along one or more edges of the target module that are accessible to the robotic manipulator; discard the particular plant (or move the particular plant into a holding module also located at the transfer station); and replace the particular plant with a sensor pod. The system can then dispatch the mover to return the target module back to its assigned location within the cluster of modules.

While the sensor pod is deployed in this target module, the system can then collect enhanced ambient and/or water data from this target module via the sensor pod and predict (e.g., interpolate, extrapolate) similar conditions at other modules in this cluster based on physical proximity to the target module. The robotic manipulator can later remove this sensor pod from the target module, such as during a next scheduled plant transfer cycle or after a preset duration (e.g., after a duration of time in which sensors in the sensor pod are predicted to remain sufficiently calibrated).

In a similar example, the system can identify a region of interest within the grow area that exhibits deviating conditions, such as greater temperature variance, greater peak light intensity, or reduced air speed relative to other regions in the facility based on data collected by fixed infrastructure in the facility and/or by the mover. The system can then elect a target module within this region of interest of the grow area and trigger the mover and robotic manipulator to cooperate to load a sensor pod into a plant slot in this target module, such as for a duration of several hours, days, or until a next scheduled plant transfer cycle for this target module.

In yet another example, the system can maintain sensor pods designated for adaptive allocation in a fixed distribution (e.g., a grid array) throughout the grow area even as modules of various types move into, out of, and through the grow area. In particular, as modules are loaded with plants, unloaded with plants, cleaned, and/or repaired, etc. and assigned different grow locations within the grow area over time, the system can trigger the robotic manipulator to load adaptive-designated sensor pods into select modules assigned grow locations that intersect a predefined distribution map for these sensor pods. The system can then interpolate ambient and water quality conditions across the entire grow area based on sparse data collected by sensor pods in these predefined locations.

In another example, the system: selects a first module and a second module containing plants at similar stages but exhibiting substantially dissimilar characteristics; prompts the robotic manipulator to load the first and second modules with adaptive-designated sensor pods; collects ambient and/or water quality data from these sensor pods over a period of time; and then derives a correlation between ambient and/or water quality conditions and plant characteristics based on data received from these sensor pods and characteristic differences of plants in the first and second modules. The system can also: select a third module and a fourth module arranged in different locations within the facility and containing plants at similar stages and exhibiting similar characteristics; prompt the robotic manipulator to load the third and fourth modules with adaptive-designated sensor pods; collect ambient and/or water quality data from these sensor pods over a period of time; and then isolate ambient and/or water quality variables that exhibit weak correlation to characteristics of these plants based on data received from these sensor pods.

9.4 Sensor Pod Allocation: Random

In yet another implementation, the system can: (pseudo-)randomly select modules arranged throughout the facility; flag these modules for enhanced monitoring; and trigger the mover and robotic manipulator to cooperate to load sensor pods into these target modules. For example, a facility housing nursery-type modules and 4000 finishing-type modules can be outfitted with 50 sensor pods dedicated to "random" distribution throughout the facility. In this example, the robotic manipulator can automatically calibrate sensors in these sensor pods, and these sensor pods can remain within a calibration range for a known or preset calibration duration (e.g., two days). During operation, when a sensor pod in this set has been deployed in a first, randomly-selected module for more than the known or preset calibration duration, the system can: trigger the mover to deliver the first module to the transfer station; randomly select a second module in the facility; and trigger the mover to deliver the second module to the transfer station. The robotic manipulator can then autonomously: remove the sensor pod from the first module; place the sensor pod in one or more calibration fluids located at the transfer station to calibrate water quality sensors in the sensor pod; place the sensor pod in an environmental chamber of known temperature, light level, and/or wind speed, etc. to calibrate ambient sensors in the sensor pod; and the return the sensor pod to a plant slot in the second module before the mover returns the second module to grow area.

By thus (pseudo-)randomly locating sensor pods throughout the facility, the system can collect enhanced ambient and water-related data for modules throughout the facility even before ambient conditions and/or water conditions proximal these modules manifest as changes in qualities of plants contained in these modules, thereby enabling the system to achieve greater probability of: 1) recording enhanced ambient and water quality data predictive of desirable and undesirable plant outcomes even before links between certain ambient and water quality conditions and plant outcomes are known; and 2) detecting and responding to ambient and water quality conditions that affect plant outcomes prior to such conditions producing visual, physical changes in these plants.

In particular, the system can deploy sensor pods randomly to modules throughout the facility in order to hedge against unknown effects of ambient and/or water quality conditions on plant characteristics that are not captured through adaptive deployment of sensor pods in the facility.

9.5 Sensor Pod Allocation: Emergency Backup

In an instance in which the system has deployed all sensor pods designated for trigger-based, adaptive, or random allocation, the system can selectively trigger the robotic manipulator to load backup-designated sensor pods into high-priority modules.

For example, the system can allocate backup-designated sensor pods for trigger-based deployment throughout the facility if the system detects a greater frequency of modules that contain plants exhibiting abnormally positive characteristics, abnormally negative characteristics, or anomalous characteristics—such as from optical images recorded by fixed infrastructure, the mover, and/or the robotic manipulator. In another example, the system can allocate backup-designated sensor pods for random deployment if data collected by fixed infrastructure in the facility and/or by the sensors in the mover indicate increased variance in ambient and/or water quality conditions in modules across the facility 10. Data Aggregation and Responsive Actions The system can then selectively trigger, schedule, or execute responsive actions within the facility based on data collected by sensor pods deployed to modules according to adaptive, random, and trigger-based allocation schema.

10.1 Module Cluster Response

Figure 6:
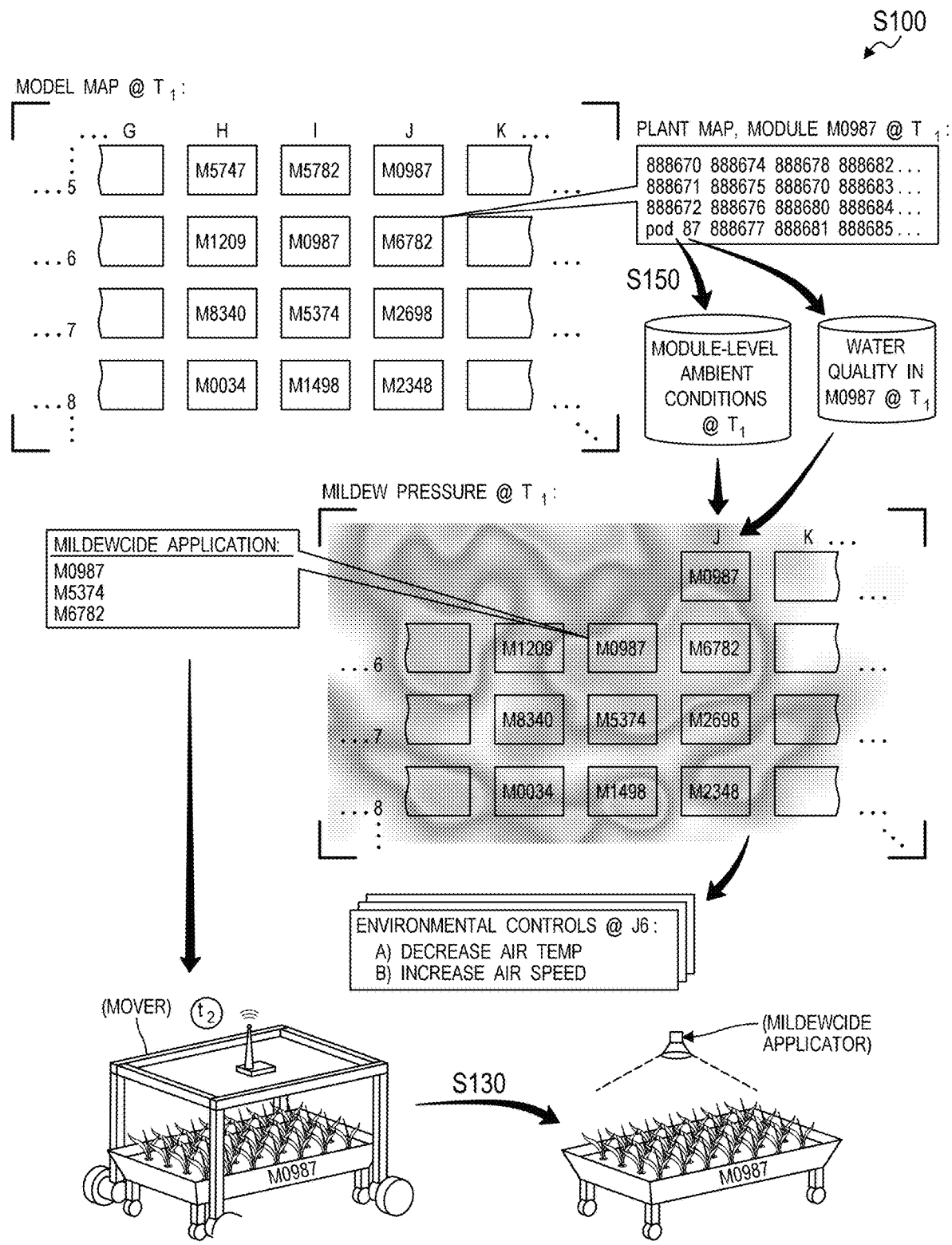
FIG. 6 is a flowchart representation of one variation of the method.

In one implementation shown in FIG. 6, the system tracks environmental exposure of plants in clusters (or "neighborhoods") of modules based on sensor data (E.g., environmental and/or water quality data) received from an individual sensor pod deployed to this cluster over time. In response to detecting a deviation of environmental and/or water quality conditions at this sensor pod and target environmental exposure for the growth stage of plants occupying these modules, the computer system can schedule or autonomously execute operational changes in the facility to reduce this deviation.

For example, the system can implement closed-loop controls to adjust artificial lighting over the cluster of modules in order to maintain a light level detected by a light level sensor in the sensor pod within a narrow target light level range, such as by automatically increasing a power setting of select artificial lighting elements over the cluster of modules if the light level detected by the sensor pod is less than a target light level and vice versa. The system can similarly control HVAC, fans, and dehumidifiers near this cluster of modules to maintain target temperature, airflow, and humidity conditions around this cluster of modules.

In another example shown in FIG. 6, the system can estimate mildew pressures in the cluster of modules based on environmental data recorded by sensors integrated into the sensor pod, such as by detecting visual mildew indicators (e.g., on a tray or on plant leaves) in photographic images captured by a camera integrated into the sensor pod or as a function of timeseries temperature and humidity data collected by the sensor pod. In this example, in response to detecting a mildew pressure that exceeds a threshold mildew pressure based on data collected by a sensor pod deployed in a particular module, the system can dispatch the mover to deliver the particular module to a mildew suppression station within the facility for selective application of a mildewcide onto plants in the particular module. The system can also identify a cluster of modules neighboring the particular target module and dispatch the mover to (sequentially) deliver each module, in this cluster of modules, to the mildew suppression station for selective application of the mildewcide. The system can also adjust environmental controls to reduce humidity near this cluster of modules. Following application of mildewcide and return of these modules to their assigned locations in the facility, the system can verify success of this responsive action based on reduction in mildew indicators in data received from the sensor pod occupying the particular module in this cluster.

10.2 Gradient

In a similar implementation shown in FIG. 6, the system can: access timestamped sensor data recorded by all deployed sensor pods, including sensor pods deployed according to adaptive, trigger-based, and random allocation schema; access locations of modules occupied by these sensor pods in the facility; and tag these timestamped sensor data with locations (e.g., (x,y) coordinates) of modules occupied by sensor pods that generated these timestamped sensor data. The system then calculates a gradient of a particular environmental condition across the agricultural facility—including at modules not occupied by sensor pods—based on timestamped sensor data recorded by this population of sensor pods and locations of these sensor pods when these sensor data were recorded. For example, the system can interpolate and extrapolate this particular environmental condition across the entire facility to generate an environmental condition gradient based on last values of this environmental condition last received from the population of sensor pods and known locations of the sensor pods throughout the facility.

The system can then implement closed-loop controls, as described above, to schedule environmental control changes in the agricultural facility, such as in order to reduce this environmental condition gradient and to drive this environmental condition to a narrow target range across the facility. The system can implement similar methods and techniques to adjust environmental controls in subareas of the facility in order to drive the environmental condition gradient in each subarea of the facility to a particular value or range.

10.3 Modeling

In another implementation, the system can selectively deploy a first sensor pod to a particular module responsive to detected deviations of plants contained in this module from expected characteristics (e.g., size, color, geometry, symmetry) for plants in this growth stage and/or responsive to detected deviations of plants contained in this module from characteristics of plants in other modules nearby. The system can similarly deploy a second sensor pod to a second module—located adjacent the particular module—containing plants not exhibiting this deviation from these expected characteristics. The computer system can then: monitor environmental and water-quality conditions in the particular module and the second module based on sensor data recorded by the first and second sensor pods; and monitor characteristics of plants in these modules based on global and/or module-level scan data recorded by fixed and/or mobile infrastructure in the facility. The system can also implement regression, machine learning, deep learning, and/or other techniques to derive correlations between the characteristic deviation of plants and the set of environmental conditions, such as based on differences between environment conditions detected by the first and second sensor pods and differences in characteristics presenting in plants in the particular and second modules.

Additionally or alternatively, in response to a magnitude of the environmental condition gradient deviating from a target environmental condition range at a particular location in the agricultural facility, the system can: query a map of module locations throughout the facility to identify a particular module (or cluster of modules) proximal the particular location of the environmental condition deviation; schedule the particular module (or the cluster of modules) for manual inspection by a human operator; and/or schedule the particular module (or the cluster of modules) for delivery to the transfer station—outside of a scheduled plant transfer cycle—for capture of a (high-resolution) module-level scan of the module or (higher-resolution) scans of individual plants occupying the module.

10.4 Water Quality Conditions

The system can implement similar methods and techniques to track, respond to, and/or develop models or correlations for water quality conditions in modules throughout the facility, such as by leveraging an assumption that water is refreshed at similar times and to similar conditions in neighboring (i.e., physically-proximal) modules throughout the facility.

11. Sensor Pod Retrieval

Later, the robotic manipulator can remove a sensor pod from a module. In one implementation, when a module is delivered to the transfer station for a next scheduled plant transfer cycle, the robotic manipulator can sequentially remove plants from the module in order of first plant slot to last plant slot. Upon reaching the sensor pod, the robotic manipulator can remove the sensor pod from the module and place the sensor pod into a holding or cleaning cell and resume transfer of remaining plants from the module. Alternatively, upon reaching the sensor pod, the robotic manipulator can pause removal of plants from the module and immediately enter a cleaning and calibration routine to clean and then calibrate the sensor pod, as described below.

Alternatively, when a predefined enhanced monitoring period for a module expires or when a calibration duration of a sensor pod expires, the system can dispatch the mover to deliver the module to the transfer station. The robotic manipulator can then: detect the module in the field of view of the optical sensor on the robotic manipulator; detect the sensor pod in the field of view of the optical sensor and/or access an address of a particular plant slot occupied by the sensor pod in the module; autonomously navigate the end effector to the particular plant slot; and then remove the sensor pod from the module without distributing other plants occupying the module.

12. Sensor Pod Calibration

Upon removing a sensor pod from a module, the robotic manipulator can execute a cleaning routine to clean and disinfect the sensor pod. For example, the robotic manipulator can place the sensor pod into a steam chamber or bleach or hydrogen peroxide bath for sanitization.

The robotic manipulator can then execute a calibration routine to recalibrate sensors in the sensor pod. For example, the robotic manipulator can: sequentially transfer the lower mast of the sensor pod—containing various water quality sensors—between a series of vessels containing calibration fluids (e.g., a fluid at a known temperature, a fluid at a known pH, and a fluid with a known dissolved oxygen level) and rinsing fluids (e.g., distilled water); and recalibrate corresponding water quality sensors accordingly. In this example, the robotic manipulator can then: place the upper mast of the sensor pod—containing various ambient sensors—into an environmental chamber held at a known temperature, light level, and/or wind speed, etc.; and calibrate ambient sensors in the sensor pod accordingly.

Once the sensor pod is cleaned and recalibrated, the robotic manipulator can place the sensor pod in a storage container while awaiting redeployment into another module.

(Alternatively, upon removing a sensor pod from a module, the robotic manipulator can execute a cleaning routine to clean the sensor pod and then place the sensor pod in a storage container; once a command to load the sensor pod into another module is received, the robotic manipulator can execute a calibration routine to calibrate the sensor pod just prior to loading the sensor pod into this module.) The robotic manipulator can additionally or alternatively execute intermediate calibration checks—such as by inserting the sensor pod sensor suite into a solution of known quality to confirm that sensor values read by the sensor pod fall within a tolerable error after removing the sensor pod from a module or before inserting the sensor pod into a module.

Therefore, in response to conclusion of a deployment period for a sensor pod deployed in a module in the facility, the system can: schedule the robotic manipulator to retrieve the sensor pod from the target module; schedule the sensor pod for cleaning; schedule the first sensor pod for recalibration of a sensor (e.g., a water-quality sensor) integrated into the sensor pod; and then later assign the sensor pod another module designated to enhanced monitoring, as described above.

In one variation, the system includes automated dosing equipment deployed in the facility, configured to dose individual modules with nutrients, and including a suite of sensors configured to detect qualities of water in individual modules. When the automated dosing equipment doses a module—loaded with a sensor pod—with nutrients, the automated dosing equipment can monitor sensor values read from its integrated water quality sensors, and the system can calibrate sensors in the sensor pod to sensor values read by the automated dosing equipment. Alternatively, the system can: verify calibration of the automated dosing equipment and the sensor pod based on alignment of concurrent sensor values read from these equipment; and selectively trigger recalibration of both the automated dosing equipment and the sensor pod responsive to misalignment of these concurrent sensor data.

13. Sensor Pod Redeployment

The system can then redeploy the recalibrated sensor pod to a module in the facility. For example, as modules are delivered to a transfer station in the facility, the system can: scan a module; determine whether plants in this module exhibit certain trigger conditions for enhanced monitoring with sensor pods; calculate a rank or priority of this module based on characteristics of plants in this module and last known characteristics of plants in other modules throughout the facility; and trigger the transfer station to insert a sensor pod into this module if the rank of this module exceeds a threshold (e.g., the module falls within a top-50 modules ranked by severity of trigger conditions exhibited by plants in these modules). In this example, the system can also identify a second module associated with a rank that no longer exceeds the threshold; trigger the mover to deliver this module to the transfer station; and trigger the robotic manipulator to remove a sensor pod from this module, clean and calibrate the sensor pod, and return the sensor pod to a holding tray, thereby ensuring that a minimum number of sensor pods designed for trigger-based deployment remain on-hand for loading into modules containing plants exhibiting such trigger conditions.

The system can similarly execute processes to identify next locations in the grow area that are good (or better) candidates for enhanced monitoring and trigger the mover and robotic manipulator to cooperate to redistribute sensor pods designated for adaptive deployment, such as by redeploying all sensor pods designated for adaptive deployment on a four-day interval. The system can similarly generate a new random distribution of sensor pods throughout the facility and trigger the mover and robotic manipulator to cooperate to redistribute sensor pods designated for random deployment, such as by redeploying all sensor pods designated for random deployment on a two-day interval.

However, the system can redeploy sensor pods throughout the facility on any other regular schedule or responsive to any other irregular events.

14. Sensor Pod Deployment and Retrieval by Mover

In one variation, the mover implements methods and techniques similar to those described above to load and unload sensor pods from modules while autonomously navigating throughout the facility.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for deploying sensors within an agricultural facility comprising:
   accessing scan data of a set of modules deployed within the agricultural facility;
   extracting characteristics of plants occupying the set of modules from the scan data;
   selecting a first subset of target modules from the set of modules, each target module in the set of target modules containing a group of plants exhibiting characteristics representative of plants occupying modules neighboring the target module;
   for each target module in the first subset of target modules, scheduling a robotic manipulator within the agricultural facility to:
      remove a particular plant from a particular plant slot in the target module; and
      load the particular plant slot with a sensor pod from a first population of sensor pods deployed in the agricultural facility; and
   monitoring environmental conditions at target modules in the first subset of target modules based on sensor data recorded by the first population of sensor pods.

2. The method of claim 1:
wherein accessing scan data of the set of modules deployed within the agricultural facility comprises accessing a set of optical images recorded by a set of fixed sensors arranged overhead a grow area within the agricultural facility;
wherein extracting characteristics of plants occupying the set of modules from the scan data comprises:
   detecting a boundary of each module in the set of modules based on features extracted from the set of optical images; and
   for each module in the set of modules:
      detecting a group of plants within a boundary of the module; and
      deriving a magnitude of a characteristic of the group of plants based on features extracted from the set of optical images;
wherein selecting the first subset of target modules from the set of modules comprises:
   segmenting the set of modules into a set of groups of neighboring modules, each group of neighboring modules, in the set of groups of neighboring modules, comprising modules containing groups of plants exhibiting similar magnitudes of the characteristic; and
   for each group of neighboring modules in the set of groups of neighboring modules, selecting a target module, in the first subset of target modules, representative of the group of neighboring modules; and
further comprising dispatching a mover in the agricultural facility to deliver each target module, in the first subset of target modules, to a transfer station proximal the robotic manipulator for loading with a sensor pod in the first population of sensor pods.

3. The method of claim 2:
wherein extracting characteristics of plants occupying the set of modules from the scan data comprises extracting colors, leaf areas, and geometries of plants in the first set of plants from the scan of the first module; and
wherein segmenting the set of modules into the set of groups of neighboring modules comprises:
   accessing a quantity of the first population of sensor pods deployed in the agricultural facility;
   calculating a quantity of discrete contiguous clusters of modules, each discrete contiguous cluster of modules containing plants exhibiting minimum color, leaf area, and geometric variance; and
   assigning each discrete contiguous cluster of modules to one group of neighboring modules in the set of groups of neighboring modules.

4. The method of claim 1, further comprising:
pseudorandomly selecting a second subset of target modules from the set of modules; and
for each target module in the second subset of target modules, scheduling the robotic manipulator to:
   remove a particular plant from a particular plant slot in the target module; and
   load the particular plant slot with a sensor pod in a second population of sensor pods allocated for random distribution within the agricultural facility.

5. The method of claim 4:
wherein scheduling the robotic manipulator to load a particular plant slot with a sensor pod in the first population of sensor pods for each target module in the first subset of target modules comprises, for each target module in the first subset of target modules, scheduling the robotic manipulator to load a particular plant slot in the target module with a sensor pod in the first population of sensor pods allocated for adaptive distribution within the agricultural facility; and
wherein scheduling the robotic manipulator to load a particular plant slot with a sensor pod for each target module in the second subset of target modules comprises, for each target module in the second subset of target modules, scheduling the robotic manipulator to load a particular plant slot in the target module with a sensor pod in a second population of sensor pods allocated for random distribution within the agricultural facility, the second population of sensor pods greater than the first population of sensor pods.

6. The method of claim 4, further comprising:
accessing sensor data recorded by the second population of sensor pods;
accessing locations of target modules in the first subset of target modules in the agricultural facility;
accessing locations of target modules in the second subset of target modules in the agricultural facility;
calculating an environmental condition gradient across the set of modules in the agricultural facility based on sensor data recorded by the first population of sensor pods, sensor data recorded by the second population of sensor pods, locations of target modules in the first subset of target modules, and locations of target modules in the second subset of target modules; and
scheduling environmental control changes in the agricultural facility to reduce the gradient.

7. The method of claim 4, further comprising:
accessing sensor data recorded by the second population of sensor pods;
accessing locations of target modules in the first subset of target modules in the agricultural facility;
accessing locations of target modules in the second subset of target modules in the agricultural facility;
calculating an environmental condition gradient across the set of modules in the agricultural facility based on sensor data recorded by the first population of sensor pods, sensor data recorded by the second population of sensor pods, locations of target modules in the first subset of target modules, and locations of target modules in the second subset of target modules; and
in response to a magnitude of the environmental condition gradient deviating from a target environmental condition range at a particular location in the agricultural facility:
   identifying a particular module, in the set of modules, proximal the particular location; and
   scheduling the particular module for inspection.

8. The method of claim 1,
wherein monitoring environmental conditions at target modules in the first subset of target modules comprises estimating mildew pressures in the first subset of target modules based on environmental data recorded by environmental sensors integrated into sensor pods in the first population of sensor pods; and
further comprising, in response to a particular mildew pressure at a particular target module, in the first subset of target modules, exceeding a threshold mildew pressure:
   dispatching a mover to deliver the particular target module to a mildew suppression station within the agricultural facility;
   identifying a cluster of modules, in the set of modules, located proximal the particular target module; and dispatching the mover to deliver each module, in the cluster of modules, to the mildew suppression station.

9. The method of claim 1:
wherein monitoring environmental conditions at target modules in the first subset of target modules comprises monitoring light levels proximal plants occupying the first subset of target modules based on light level data recorded by light level sensors integrated into sensor pods in the first population of sensor pods; and
further comprising, in response to a particular light level proximal a particular target module, in the first subset of target modules, falling outside of a target light level range for a current time:
  accessing a particular location in the agricultural facility occupied by the particular target module; and
  activating artificial lighting proximal the particular location in the agricultural facility.

10. The method of claim 1, further comprising:
based on characteristics of plants occupying the set of modules, detecting a first module, in the set of modules, containing a first set of plants exhibiting a characteristic deviation from plants occupying a first subset of modules, in the set of modules, located proximal the first module;
in response to a magnitude of the characteristic deviation exceeding a threshold deviation, scheduling the robotic manipulator to:
  remove a first plant from a first plant slot in the first module; and
  load the first plant slot with a first sensor pod, in the first population of sensor pods;
monitoring a set of environmental conditions in the first module based on sensor data recorded by the first sensor pod; and
calculating correlations between the characteristic deviation and environmental conditions in the set of environmental conditions.

11. The method of claim 1, further comprising:
dispatching a mover to deliver a first module, in the set of modules, to the transfer station, the first module occupied by a first set of plants;
at the robotic manipulator, recording a scan of the first set of plants in the first module;
detecting a feature, in the scan, associated with an insect pressure;
at the robotic manipulator:
  removing a first plant from a first plant slot in the first module; and
  loading the first plant slot with a first sensor pod comprising an insect trap and an optical sensor facing the insect trap;
dispatching the mover to deliver the first module to a grow area in the agricultural facility;
accessing an optical image recorded by the optical sensor in the first sensor pod;
detecting a quantity of insects depicted on the insect trap in the optical image;
interpreting a magnitude of insect pressure at the first module based on the quantity of insects; and
predicting magnitudes of insect pressures at a first cluster of modules, in the set of modules, located proximal the first module.

12. The method of claim 1, further comprising:
dispatching a mover to deliver a first module, in the set of modules, from an assigned grow area in the agricultural facility to the transfer station, the first module occupied by a first set of plants;
at the robotic manipulator, recording a scan of the first set of plants in the first module;
detecting a feature, in the scan, associated with presence of a particular insect in the first module;
at the robotic manipulator:
  removing a first plant from a first plant slot in the first module; and
  loading the first plant slot with an insect pod containing beneficial insects that parasitize the particular insect; and
dispatching the mover to deliver the first module to the assigned grow area in the agricultural facility.

13. The method of claim 1, further comprising:
dispatching a mover to deliver a first module, in the set of modules, to the transfer station, the first module associated with a first plant growth stage and comprising a first set of plant slots occupied by a first set of plants;
dispatching the mover to deliver a second module, in the set of modules, to the transfer station, the second module associated with a second plant growth stage succeeding the first plant growth stage and comprising a second set of plant slots fewer than the first set of plant slots;
dispatching the mover to deliver a third module, in the set of modules, to the transfer station, the third module associated with the second plant growth stage and comprising a third set of plant slots fewer than the first set of plant slots;
at the robotic manipulator, recording a scan of the first set of plants in the first module;
based on the scan, detecting a deviation of the first set of plants from a target characteristic of plants approaching the second plant growth stage;
at the robotic manipulator:
  in response to detecting the deviation, loading a second sensor pod into a particular plant slot in the second set of plant slots in the second module;
  transferring a first subset of plants in the first set of plants in the first module into remaining plants slots in the second set of plant slots in the second module; and
  transferring a first subset of plants in the first set of plants in the first module into the third set of plant slots in the first module;
dispatching the mover to deliver the second module to a grow area in the agricultural facility;
dispatching the mover to deliver the third module to the grow area in the agricultural facility; and
monitoring environmental conditions in the second module based on sensor data recorded by the second sensor pod.

14. The method of claim 13, further comprising:
extracting a characteristic of plants in the first set of plants from the scan of the first module;
defining the first subset of plants exhibiting a first range of the characteristic;
defining the second subset of plants exhibiting a second range of the characteristic distinct from the first range of the characteristic; and
assigning the second sensor pod to the first subset of plants in response to the first range of the characteristic deviating from the target characteristic more than the second range of the characteristic.

15. The method of claim 13:
wherein detecting the deviation of the first set of plants from the target characteristic based on the scan comprises:
extracting colors, leaf areas, and geometries of plants in the first set of plants from the scan of the first module;
calculating a magnitude of the deviation proportional to differences between:
sizes of plants in the first set of plants and a target plant size for plants entering the second plant growth stage;
leaf areas of plants in the first set of plants and a target leaf area for plants entering the second plant growth stage; and
geometries of plants in the first set of plants and a target symmetry for plants entering the second plant growth stage; and
wherein loading the second sensor pod into the particular plant slot in the second set of plant slots in the second module comprises loading the second sensor pod into the particular plant slot in the second set of plant slots in the second module in response to the magnitude of the deviation exceeding a threshold magnitude.

16. The method of claim 1, further comprising, for each target module in the first subset of target modules:
deriving a viability score for each plant in a set of plants occupying the target module based on the scan data; and
flagging the particular plant, characterized by a lowest viability score in the set of plants occupying the target module, for replacement with a sensor pod from the first population of sensor pods.

17. The method of claim 1:
further comprising, for a first target module in the first subset of target modules, estimating a representative height of a first set of plants occupying plants slots in the target module based on the scan data; and
further comprising, at the robotic manipulator:
retrieving a first sensor pod from the first population of sensor pods, the first sensor pod comprising:
a base configured to load into a plant slot;
a water-quality sensor arranged in the base;
a mast extending above the base; and
a light level sensor coupled to a distal end of the mast opposite the base;
adjusting a height of the mast of the first sensor pod to approximately the representative height of the first set of plants; and
loading the first sensor pod into a particular plant slot in the first target module; and
wherein monitoring environmental conditions at target modules in the first subset of target modules comprises monitoring light levels proximal tops of plants occupying target modules in the first subset of target modules based on light level data recorded via light level sensors in the first population of sensor pods.

18. The method of claim 1,
wherein monitoring environmental conditions at target modules in the first subset of target modules comprises monitoring environmental conditions in the first subset of target modules based on sensor data recorded by the first population of sensor pods during a first deployment period;
further comprising, in response to conclusion of the first deployment period:
scheduling the robotic manipulator to retrieve a first sensor pod from a first target module in the first subset of target modules;
scheduling the first sensor pod for cleaning; and
scheduling the first sensor pod for recalibration of a sensor integrated into the sensor pod;
further comprising, during a second deployment period succeeding the first deployment period, scheduling the robotic manipulator to:
remove a second plant from a second plant slot in a second module, in the set of modules, different from the first target module; and
load the second plant slot with the first sensor pod; and
further comprising, during the second deployment period, monitoring environmental conditions at the second module based on sensor data recorded by the first sensor pods.

19. A method for deploying sensors within an agricultural facility comprising:
accessing scan data of a set of modules deployed within the agricultural facility;
extracting characteristics of plants occupying the set of modules from the scan data;
selecting a first subset of target modules from the set of modules, each target module in the set of target modules containing plants exhibiting characteristics representative of groups of plants occupying modules neighboring the target module;
pseudorandomly selecting a second subset of target modules from the set of modules;
based on characteristics of plants occupying the set of modules, identifying a set of groups of plants exhibiting characteristics approximating a predefined trigger condition;
selecting a third subset of target modules from the set of modules, each target module in the third subset of target modules occupied by a group of plants in the set of groups of plants;
for each target module in the first subset of target modules, the second subset of target modules, and the third subset of target modules, scheduling a robotic manipulator within the agricultural facility to:
remove a particular plant from a particular plant slot in the target module; and
load the particular plant slot with a sensor pod from a first population of sensor pods deployed in the agricultural facility; and
monitoring environmental conditions at target modules in the first subset of target modules, the second subset of target modules, and the third subset of target modules based on sensor data recorded by the first population of sensor pods.

20. A method for deploying sensors within an agricultural facility comprising:
dispatching a loader to autonomously deliver a first module to a transfer station within the agricultural facility, the first module defining a first array of plant slots at a first density and loaded with a first set of plants at a first plant growth stage;
dispatching the loader to autonomously deliver a second module to the transfer station, the second module defining a second array of plant slots at a second density less than the first density and empty of plants;
recording a module-level optical scan of the first module at the transfer station;
extracting characteristics of the first set of plants from the module-level optical scan;

in response to characteristics of the first set of plants approximating a predefined trigger condition, triggering the robotic manipulator to load a sensor pod into a plant slot in the second module;

triggering the robotic manipulator at the transfer station to transfer a first subset of the first set of plants from the first module into open plant slots in the second module;

dispatching the loader to autonomously deliver the second module to a grow area within the alignment feature facility; and detecting environmental conditions at the second module based on sensor data collected by the sensor pod.

\* \* \* \* \*